United States Patent
Schmidt

(10) Patent No.: US 7,997,895 B1
(45) Date of Patent: Aug. 16, 2011

(54) INJECTION APPARATUS FOR INJECTION MOLDING OF THERMOPLASTIC PARTS

(75) Inventor: Harald Schmidt, Georgetown (CA)

(73) Assignee: Mold Hotrunner Solutions Inc., Georgetown (CA)

( * ) Notice: Subject to any disclaimer, the term of this patent is extended or adjusted under 35 U.S.C. 154(b) by 25 days.

(21) Appl. No.: 12/755,095

(22) Filed: Apr. 6, 2010

(51) Int. Cl.
B29C 45/23 (2006.01)

(52) U.S. Cl. ......... 425/564; 425/566; 425/570; 425/572

(58) Field of Classification Search ................ 425/562, 425/564, 566, 570, 572
See application file for complete search history.

(56) References Cited

U.S. PATENT DOCUMENTS

| | | | |
|---|---|---|---|
| 4,917,594 A | 4/1990 | Gellert | |
| 4,919,606 A | 4/1990 | Gellert | |
| 4,979,892 A | 12/1990 | Gellert | |
| 5,288,225 A | 2/1994 | Schmidt et al. | |
| 5,478,230 A | 12/1995 | McGrevy | |
| 5,511,968 A | 4/1996 | Guzzini et al. | |
| 5,518,393 A | 5/1996 | Gessner | |
| 5,533,882 A | 7/1996 | Gessner et al. | |
| 5,635,227 A | 6/1997 | Whisenhunt et al. | |
| 5,916,605 A | 6/1999 | Swenson et al. | |
| 6,062,840 A | 5/2000 | Lee et al. | |
| 6,183,239 B1 | 2/2001 | Belous | |
| 6,261,075 B1 | 7/2001 | Lee et al. | |
| 6,343,925 B1 | 2/2002 | Jenko | |
| 6,575,731 B1 | 6/2003 | Olaru et al. | |
| 6,755,641 B1 | 6/2004 | Nakaniski | |
| 7,086,852 B2 | 8/2006 | Nakaniski | |
| 2004/0047935 A1* | 3/2004 | Moss et al. | 425/145 |
| 2004/0109914 A1 | 6/2004 | Tabassi | |
| 2005/0233028 A1 | 10/2005 | Ciccone | |
| 2009/0102099 A1* | 4/2009 | Feick et al. | 425/566 |
| 2009/0159828 A1 | 6/2009 | Esser | |
| 2009/0256282 A1 | 10/2009 | Olaru et al. | |

OTHER PUBLICATIONS

Brochure entitled "Extensions of Product Range/Universal Needle Valve" by Hasco dated Oct. 2008.
Press Release entitled "Evolution in Stack Molds" by Thermoplay dated 2007.
Brochure entitled "Ewikon Hotrunner Systems/Product Guide" published by Ewikon Heisskanalysysteme GmbH & Co. KG in Oct. 2005.
Innovation in Valve Gate Technology, published by Gunther Hot Runner Systems, Inc. (undated).
Brochure entitled "Mold Hotrunner Solutions" published by Mold Hotrunner Solutions Inc. in 2006.
"Front Mounted Valve Gates" leaflet published by Husky Injection Molding Systems in Jun. 1997.

(Continued)

*Primary Examiner* — Timothy Heitbrink
(74) *Attorney, Agent, or Firm* — McMillan LLP

(57) ABSTRACT

An injection apparatus for injecting hot plastics material into an injection mold has an actuator section forming an actuator chamber and a nozzle member connected to the actuator section and extending to a nozzle tip having an injection aperture. The nozzle member includes an injection passage system for conducting the hot plastics material to the injection aperture. An elongate valve pin extends through a guide passage in the nozzle member and is movable between open and closed positions. A piston is connected to this pin, is slidably mounted in the actuator chamber and moves the valve pin between the open and closed positions. The piston and actuator section are machined to close tolerances so as to form a micro-gap between the wall of the piston and the wall of the chamber thereby avoiding fluid seals. The actuator is able to operate at temperatures ranging between 200 and 400° C.

28 Claims, 16 Drawing Sheets

OTHER PUBLICATIONS

Brochure entitled "Master-Shot Dusen" published by Mold-Masters Limited apparently published in 1985.

Brochure entitled "Mold-Masters System V 13 Immediate Delivery" published by Mold-Masters Limited 1979.

Leaflet entitled "Precision Series Valve Gate" published by Fastheat, undated.

Brochure entitled "Injection Molding With Modular Hot Runner Systems" published by Mold-Masters Limited 1987.

Leaflet entitled "Thermoject Integral/Big Shot" published by Plastic Service GmbH (undated).

Leaflet entitled "1250 Series Nozzles" published by Husky Injection Molding Systems Inc. 1997.

Brochure entitled "System V12"Single and V14 "Single" published by Mold-Masters Limited apparently published in 1984.

Leaflet entitled "Hot Runner Nozzles" published by ProTool AG, Euro mould 2008.

Brochure entitled ". . . the million maker" published by Otto Manner GmbH, (undated).

Article entitled "Hot Shots, New Nozzles and Controls Add Sizzle to Runnerless Molding" printed Nov. 2006, www.ptonline.com.

Brochure entitled "For The Big Shot" published by Mold-Masters Limited 1986.

Brochure entitled "230 V-24 V-5V" published by Gunther Heisskanaltechnik (undated).

Brochure entitled "Electrical needle drive unit for valve gate systems" published by Ewikon Heisskanalysysteme GmbH & Co. KG in Jun. 2006.

Article entitled "New Thermal & Valve-Gate Nozzles and Controller" by mastip.com, in Plastics Technology May 2008.

Brochure entitled "Hot-Runner Systems Technology, Quality and Efficiency without Compromise" published by Otto Manner Heisskanalsysteme GmbH (undated).

Brochure entitled "Ewikon valve gate technology" published by Ewikon Hotrunner Systems of America Inc. Jun. 2006.

Leaflet entitled "E-mag-v valve with E-mag Control-v" published by PSG Plastic Service GmbH Oct. 2007.

Brochure entitled "Packing Hotrunners" published by Mold Hotrunner Solutions Inc. Jul. 2002.

Brochure entitled "Mold Hotrunner Solutions" published by Mold Hotrunner Solutions 2009.

Brochure entitled "Tradesco" published by Tradesco, undated.

* cited by examiner

INJECTION APPARATUS FOR INJECTION MOLDING OF THERMOPLASTIC PARTS

This invention relates to injection apparatus for delivering and injecting hot plastics material into an injection mold for molding plastic products or parts and also to hotrunner systems for injecting plastics material from a plasticizer unit into an injection mold.

BACKGROUND OF THE INVENTION

Similar plastic parts are commonly produced in injection molds with single or multiple cavities. In the case of an injection molding machine wherein the mold has multiple cavities, it is known to use a hotrunner system to deliver the hot plastics material or melt from a melt plastification barrel of the machine to the cavities in the mold. The hotrunner system provides the plastic melt at a defined melt pressure and a controlled melt temperature to each mold cavity. In order to accomplish this objective, the hotrunner system commonly employs a heated manifold through which melt conduits extend and heated injection nozzles.

Nozzle valve gates are used in the aforementioned melt distribution systems to control the opening and closing of gate orifices, that is, the orifices that open into each mold cavity and through which the melt is delivered. The valve gate is a positive shut off device that has an open and closed position. At the beginning of melt injection, a valve pin of the valve gate opens the orifice in order to allow the plastic melt to fill the adjacent cavity. In addition, after the cavity has been filled, the gate orifice remains open during a packing phase which relies on packing pressure to control the quality of the plastic part. While the thermoplastic melt starts to solidify during the packing phase, the valve gate closes the orifice to achieve a clean gate mark on the plastic part surface and to avoid stringing or drooling of melt through the gate from the hotrunner system while the mold opens for part injection.

A melt channel or passage is formed in the nozzle of the valve gate to deliver the hot plastics melt to the gate orifice. Movement of the valve pin inside this melt channel is generally an open and closed stroke in the axial or longitudinal direction of the nozzle. The valve pin is actuated between open and closed positions by means of a valve actuator that is connected to a rear end of the valve pin. With known hotrunner systems, the valve actuator is commonly located externally of the heated components of the hotrunner system (for example, the manifold) because the commonly used valve actuators are not functional at the usual melt processing temperature of thermoplastics materials which is between 200 and 450° C. Generally pneumatic and hydraulic valve actuators are provided with seals between the pistons and their respective cylinders that operate only below 200° C. Also, electromechanic actuators require a low ambient temperature of less than 200° C. It will be understood that a heated melt distribution system or hotrunner system inside a valve gate mold can, depending on the location of the actuators, affect the valve actuators by heat conductivity, radiation and convection. Because of this effect, valve actuators are commonly positioned at a sufficient distance from the heated surface of the melt distribution manifold and the injection nozzle to keep them within their operating temperature range, which is preferably below 100° C. Known valve pin actuators can be physically separated from the heated manifold and the injection nozzle or nozzles by means such as levers, racks, yokes and extended push/pull rods which allow the actuators to be located in a remote location where the actuator temperature can be maintained below 100° C. In addition to this thermal separation from the hotrunner manifold and the nozzles, it is known to provide for direct or indirect cooling of the actuators. Thus a cooling circuit within the injection mold can be directly or indirectly connected with the actuator to withdraw heat from the actuator.

It is also known to provide injection molds with a high number of cavities for making small plastic parts and it is advantageous to make such a mold as compact as possible. However, it is difficult and costly to integrate valve actuators with an effective cooling system in a compact mold of this type. Generally, valve pin actuators require considerable space inside an injection mold and they can add to the overall stack height of the mold. Moreover, forming cutout spaces for the actuators and bores or cutouts for cooling lines as well as air, hydraulic, or electric lines weakens the mold plate structure that has to support the substantial forces of the melt injection pressure inside the mold cavities and the clamping force in the molding machine.

U.S. Pat. No. 6,062,840 which issued May 16, 2000 to Dynisco Hotrunners, Inc., describes a co-injection molding system that employs three position actuators for moving respective valve pins into a closed position, a middle position or an open position in which skin and core material flow is permitted. The actuator includes a first piston slidably mounted in an actuator housing and a second piston attached to the valve pin, slidably mounted within the first piston. This known system has a manifold through which the melt is distributed and a top clamp plate in which the actuators are located. The piston in the actuator is equipped with ring seals extending around its circumference.

In recent U.S. Pat. No. 7,086,852 dated Aug. 8, 2006, each of the valve gate pins is connected at its rear end to a yoke plate located on one side of a central manifold. Opposite end sections of each yoke plate are connected to piston/cylinder actuators by means of actuator rods.

U.S. Pat. No. 5,533,882 describes a hotrunner valve gated system with at least one nozzle housing positioned in a manifold plate. The housing includes a gate orifice and a reciprocal valve stem positioned therein. There is an actuator for moving the valve stem for opening and closing the gate valve and it is designed to maintain the mechanism in a substantially cooled state. This mechanism is positioned coaxially relative to the nozzle housing. The piston of the actuator extends around the circumference of the nozzle and is connected at its mid point to the valve stem by means of a horizontal piston rod. The piston has at least a couple of seal rings between it and the manifold plate or structure that forms the cylinder for the piston.

There is disclosed herein an injection apparatus for injecting hot plastics material into an injection mold which has an actuator for the valve pin wherein the piston of the actuator is connected to the rear end of the valve pin and wherein the actuator can be used in relatively high temperature plastics injection temperature conditions because no fluid seals are required between the piston and the wall of the actuator chamber in which the piston moves.

SUMMARY OF THE DISCLOSURE

According to one embodiment of the present disclosure, an injection apparatus for delivering and injecting hot plastics material into an injection mold for molding a plastic product or part includes a chamber forming body having a first passage arrangement for flow of the hot plastics material from a plastics inlet provided in the body through the body to at least one plastics outlet. The body forms an actuator chamber. A nozzle part is connected to the body and has a longitudinal axis. The nozzle part extends in the longitudinal direction to a nozzle tip having an injection aperture for the hot plastics material to flow into the injection mold. The nozzle part has a second passage arrangement operably connected to the at least one plastics outlet for conducting the hot plastics material through the nozzle part to the injection aperture. An elongate valve pin extends through a longitudinally extending guide passage formed in the nozzle part and is movable in the guide passage in the longitudinal direction between an open position at which the hot plastics material can flow through the injection aperture into the injection mold and a closed position which stops flow of the plastics material through the injection aperture. A piston is connected to a rear end of the valve pin, slidably mounted in the actuator chamber, and adapted to move the valve pin between the open and closed positions by means of fluid pressure in the actuator chamber during use of the injection apparatus. The piston and the body are machined to close tolerances so as to form a microgap between a peripheral wall of the piston and an adjacent wall of the actuator chamber, thereby avoiding fluid seals between the piston and the adjacent wall of the actuator chamber. The chamber forming body and the piston together provide an actuator for the valve pin able to operate within plastics injection temperatures ranging between 200 and 400° C.

In an exemplary version of this injection apparatus, the first passage arrangement splits into at least two sub-passageways in the body and these at least two sub-passageways are distributed around the wall of the body forming the actuator chamber.

According to another embodiment of the present disclosure, there is provided a hotrunner system for injecting plastics material from a plasticizer unit into an injection mold for molding plastic devices and parts. The hotrunner system includes a hotrunner manifold having an inlet for receiving melted plastics material from the plasticizer unit and a plastics feed conduit connected to the inlet. This manifold is adapted for operation at a desired elevated temperature suitable for flow of the melted plastics material through the manifold without undesirable degradation. The system further includes at least one injection apparatus operatively connected to a downstream end of the feed conduit. The or each injection apparatus has a nozzle device having a longitudinal axis and a longitudinal injection passage extending to a nozzle tip. An elongate valve pin extends through a longitudinal guide passage formed in the nozzle device and is movable in the passage in the direction of the longitudinal axis between an open position at which the melted plastics material can flow from the nozzle tip into the injection mold and a closed position to stop the flow of the plastics material from the nozzle tip. A piston is connected to a rear end of the valve pin, is slidably mounted in an actuator chamber formed in the nozzle device, and is adapted to move the valve pin between the open and closed positions by means of fluid pressure in the actuator chamber during use of the hotrunner system. The or each injection apparatus, including the actuator chamber, its piston and the valve pin, is mounted on or in a side of the manifold facing the injection mold. The piston and a section of the injection apparatus forming the actuator chamber is machined to close tolerances so as to form a microgap between a peripheral wall of the piston and the adjacent wall of the actuator chamber in the range of 1 to 10 microns (μms), thereby avoiding fluid seals between the piston and the wall of the actuator chamber. The or each nozzle device and its piston provide a valve pin actuator able to operate within plastics injection temperatures ranging between 200 and 400° C.

In an exemplary version of this hotrunner system, the or each valve pin actuator is a pneumatic actuator, gas bores are formed in the hotrunner manifold for delivering pressurized air or gas to or from the or each actuator chamber, and the piston and the adjacent wall of the actuator chamber have approximately the same coefficient of thermal expansion.

According to another embodiment of the present disclosure, there is provided a hotrunner system for injecting plastics material from a plasticizer unit into an injection mold for molding plastics devices or parts. The hotrunner system includes a hotrunner manifold having an inlet for receiving melted plastics material from the plasticizer unit and a plastics feed conduit connected to the inlet. The manifold is adapted for operation at a desired elevated temperature suitable for flow of the melted plastics material through the manifold without undesirable degradation. The manifold forms actuator chambers. A plurality of nozzle members are mounted on at least one side of the manifold and each has a longitudinal axis. Each nozzle member has an injection passage operatively connected to a respective outlet of the feed conduit and extends to a nozzle tip and has a longitudinal guide passage formed therein. Each of a plurality of elongate valve pins extends through a respective one of the guide passages and is movable therein between an open position at which the melted plastics material can flow from the respective nozzle tip into the injection mold and a closed position which stops flow from the nozzle tip. Each of a plurality of pistons is connected to a rear end of a respective one of the valve pins, is slidably mounted in an associated one of the actuator chambers, and is adapted to move its respective valve pin between the open and closed positions by means of fluid pressure in the associated actuator chamber. The pistons and cylindrical walls of the manifold forming the actuator chambers are machined to close tolerances so as to form a micro gap between a peripheral wall of each piston and the adjacent cylindrical wall of the associated actuator chamber in the range of 1 to 10 μm, thereby avoiding fluid seals between each piston and the adjacent cylindrical wall. Each piston and its associated actuator chamber provides a valve pin actuator able to operate within plastic injection temperatures ranging between 200° C. and 400° C.

These and other aspects of the disclosed injection apparatus and hotrunner systems will become more readily apparent to those having ordinary skill in the art from the following detailed description taken in conjunction with the drawings provided herewith.

BRIEF DESCRIPTION OF THE DRAWINGS

So that those having ordinary skill in the art to which the present disclosure pertains will more readily understand how to make and use the subject invention, exemplary embodiments thereof will be described in detail herein below with reference to the drawings, wherein.

DETAILED DESCRIPTION OF EXEMPLARY EMBODIMENTS

Figure 1:
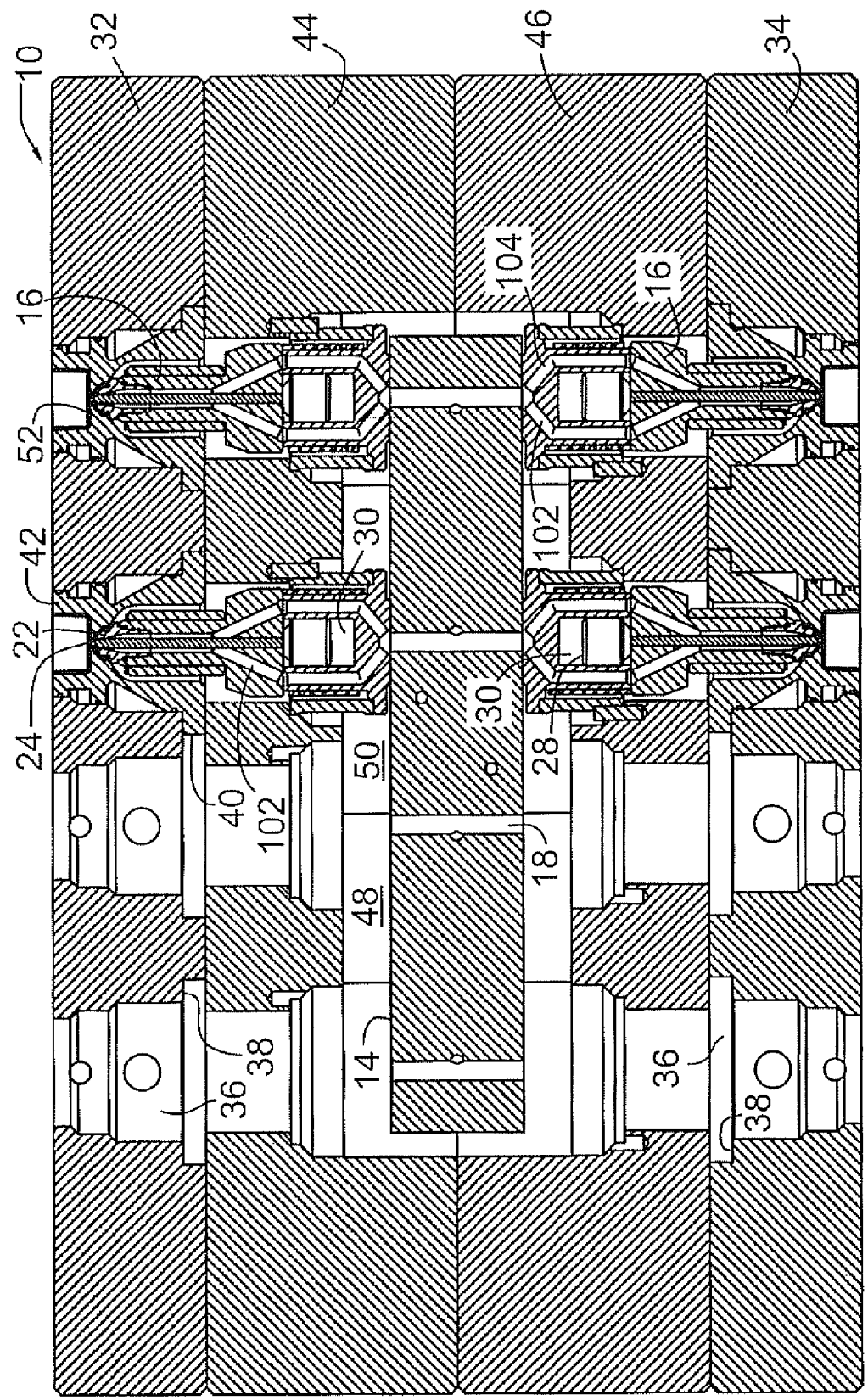
FIG. 1 is a longitudinal cross-section of a hotrunner molding machine constructed in accordance with the present disclosure, this view being partially broken away on the left side for sake of illustration.
Figure 2:
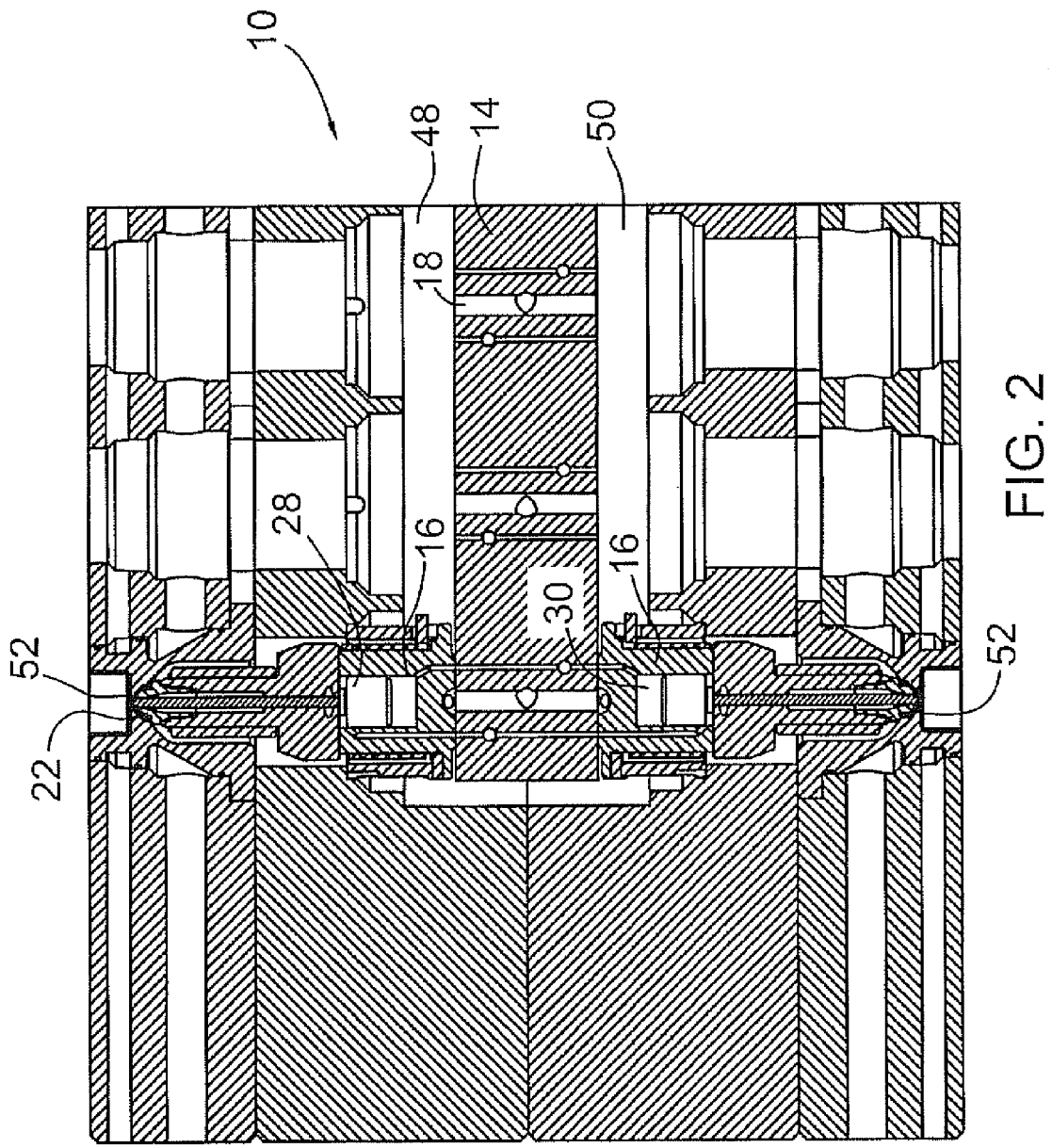
FIG. 2 is a transverse cross-section of the hotrunner molding machine of FIG. 1 with a portion of the machine on the right side being omitted for ease of illustration.
Figure 5:
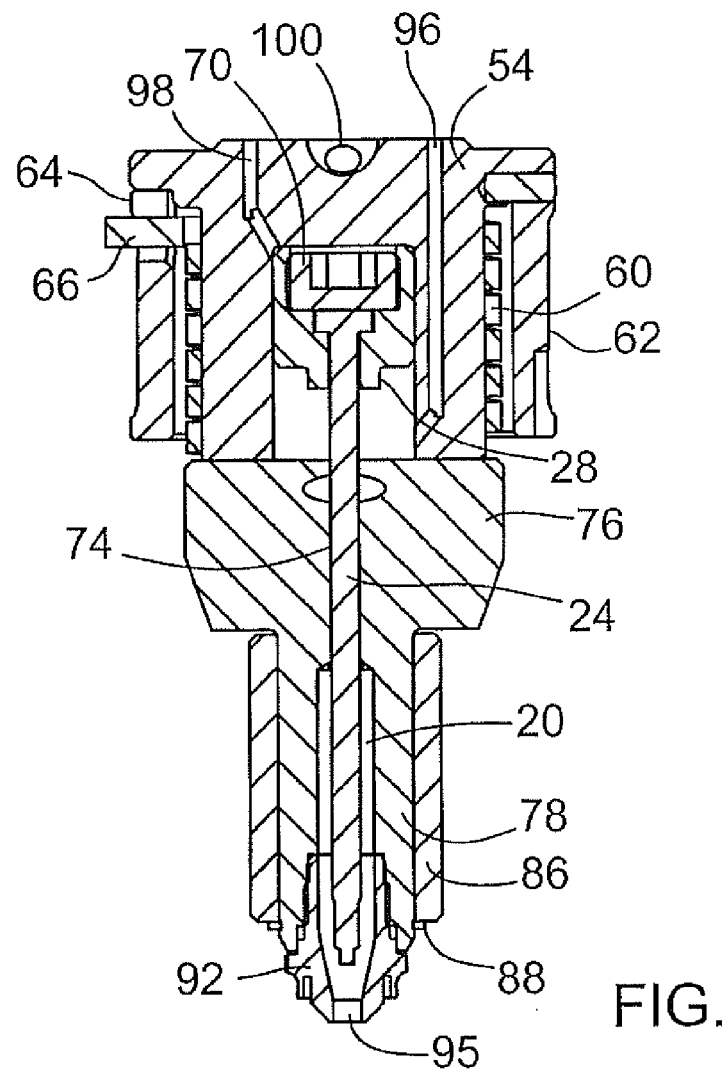
FIG. 5 is a longitudinal cross-section of the nozzle valve gate taken along the line V-V of FIG. 4.
Figure 6:
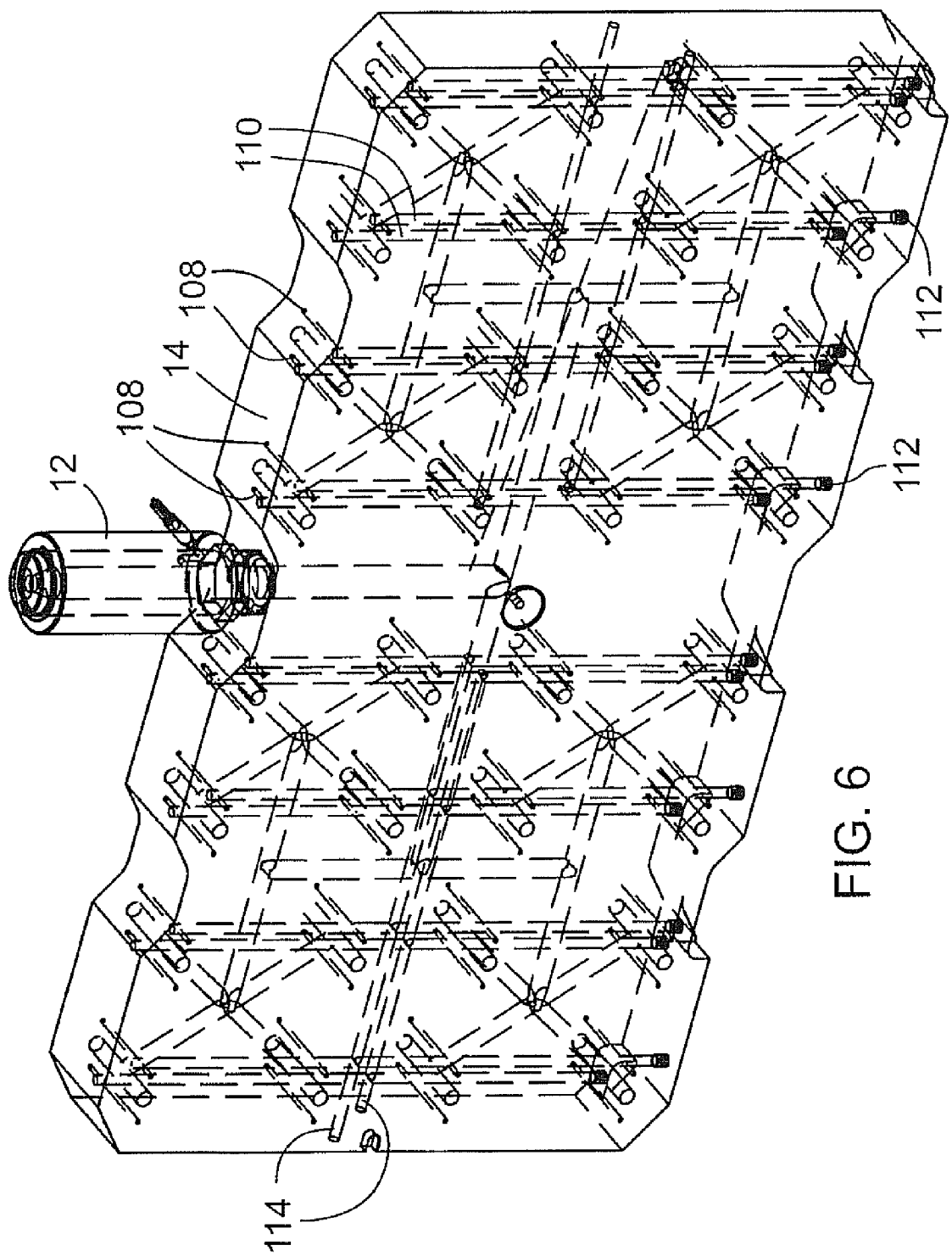
FIG. 6 is a transparent, perspective view of a manifold plate that can be used in a hotrunner system.
Figure 7:
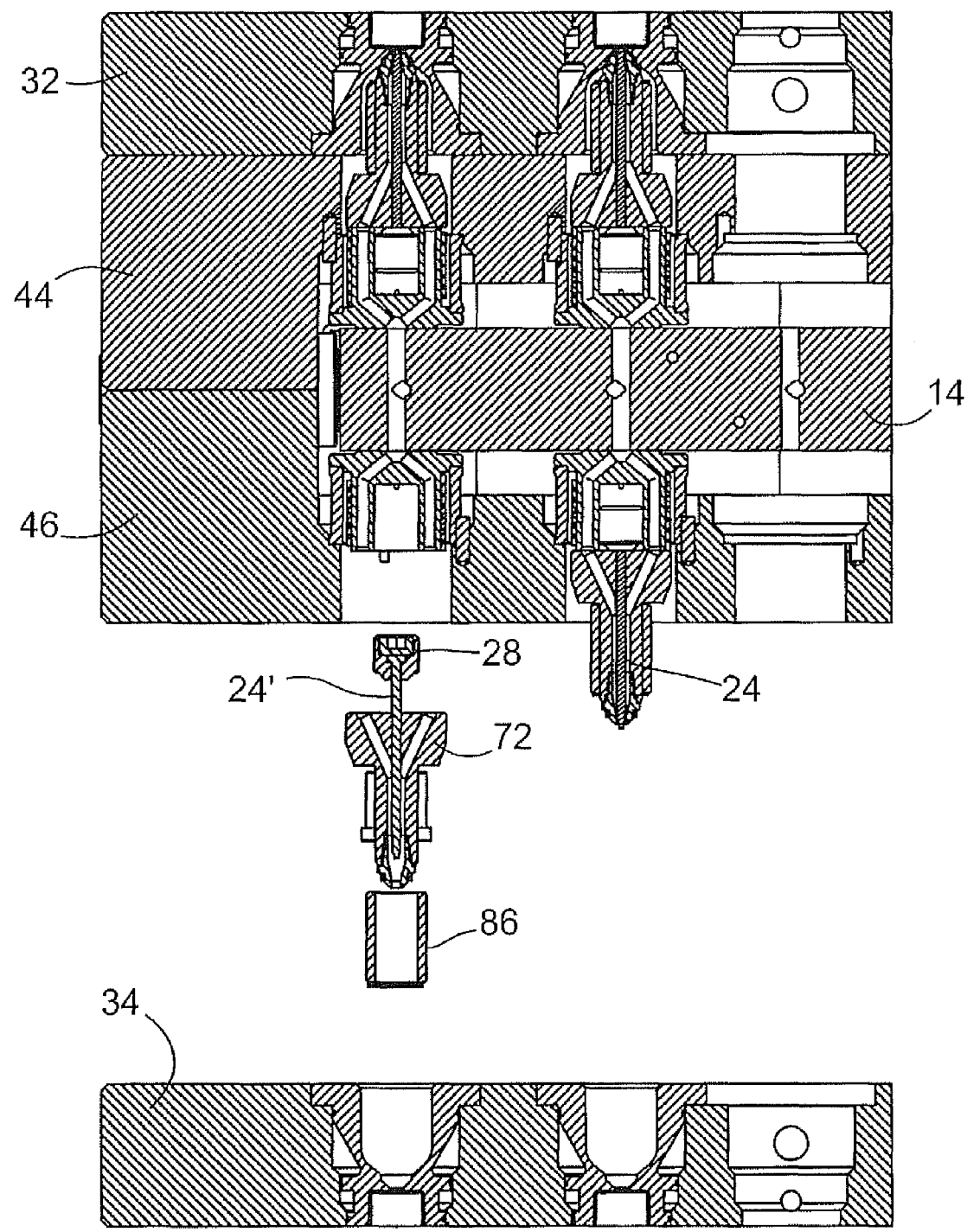
FIG. 7 is a partial, longitudinal cross-section of the hotrunner molding machine of FIG. 1, this view showing a cavity plate on the bottom side in a separated position in order to allow access to and disassembly of a nozzle valve gate.

Shown in FIGS. 1 and 2 is a partially illustrated hotrunner system 10 for injecting plastics material from a plasticiser unit into an injection mold for molding plastic devices or parts. A barrel of a plasticiser unit is shown in FIG. 6 and is indicated at 12. It will be appreciated that the barrel and the plasticiser unit are of standard construction and are well known in the manufacture of plastic products. FIG. 6 illustrates the barrel connected to one side edge of a manifold plate 14, a cross-section of which is shown in FIGS. 1 and 2. The barrel is typically heated to the required temperature for the particular plastics material being used by heaters such as electrical heaters. The manifold plate itself is heated to an elevated temperature suitable for conducting the melted plastics material without significant thermal degradation by electric heaters (not shown). A plurality of injection apparatus 16 are mounted in the hot runner molding machine with FIG. 1 showing four of these apparatus, two on each side of the manifold plate plus an additional four cavities in which four further apparatus can be mounted. Each of these apparatus is mounted to a downstream end of a plastics feed conduit indicated generally at 18. Each injection apparatus is in the form of a nozzle device having a longitudinal axis that extends perpendicular to the adjacent surface of the manifold plate. Each injection apparatus has a longitudinal injection passage 20, a portion of which can be seen in FIG. 5 and FIG. 8. This passage extends to a nozzle tip 22 which can be of standard construction. Each injection apparatus also has an elongate valve pin 24 extending through a longitudinal guide passage formed in a nozzle device. This passage is indicated at 26 in FIG. 8. The valve pin is movable in this passage in the direction of the longitudinal axis between an open position at which the melted plastics material can flow from the nozzle tip into the injection mold and a closed position to stop the flow of the plastics material from the nozzle tip. The valve pins are shown in the closed position in FIGS. 1, 2 and 8 while FIG. 7 shows the valve pin indicated at 24' in the open position. A cylindrical piston 28, which in an exemplary embodiment is made of tool steel is connected to a rear end of the valve pin and is slidably mounted in an actuator chamber 30 which is formed in the nozzle device. The piston is adapted to move the valve pin 24 of each injection apparatus between the open and closed positions by means of fluid pressure in the actuator chamber 30 during use of the hotrunner system.

Other major components of the hotrunner molding machine of FIGS. 1 and 2 include two cavity plates 32 and 34 located at the top and at the bottom of the machine as illustrated in these figures. Each plate is formed with stepped cavities 36 in each of which is mounted a portion of a respective one of the injection apparatus 16. In particular each of these cavities can be formed with an annular shoulder at 38 which engages an annular flange 40 formed on annular mold section 42 into which a section of the injection apparatus extends. Located between the two cavity plates are two, similar manifold mold plates 44, 46 which are held against one another under pressure applied through the cavity plates. Formed between the two mold plates is a manifold cavity 48 with only a left portion of this cavity being shown in FIG. 2. The manifold plate 14 is mounted centrally in this cavity as shown so that there is an insulating air gap 50 extending completely around the manifold plate. Furthermore it will be understood by those skilled in the hotrunner art that coolant passageways (not shown) can be formed in the cavity plates 32, 34 which are typically maintained at a temperature in the range of 200 to 400° C. The actual temperature selected in this range will depend upon the particular type of plastic being molded. Additional coolant passages (not shown) can be formed in the mold plates 44, 46. A suitable coolant is circulated through these passages to maintain these plates at the desired temperature for operation of the mold apparatus and the hotrunner system. Mold cavities 52 are typically formed in the mold inserts or mold sections 42 that are secured in the cavity plates so the mold apparatus can be used to make the desired plastics parts.

Figure 3:
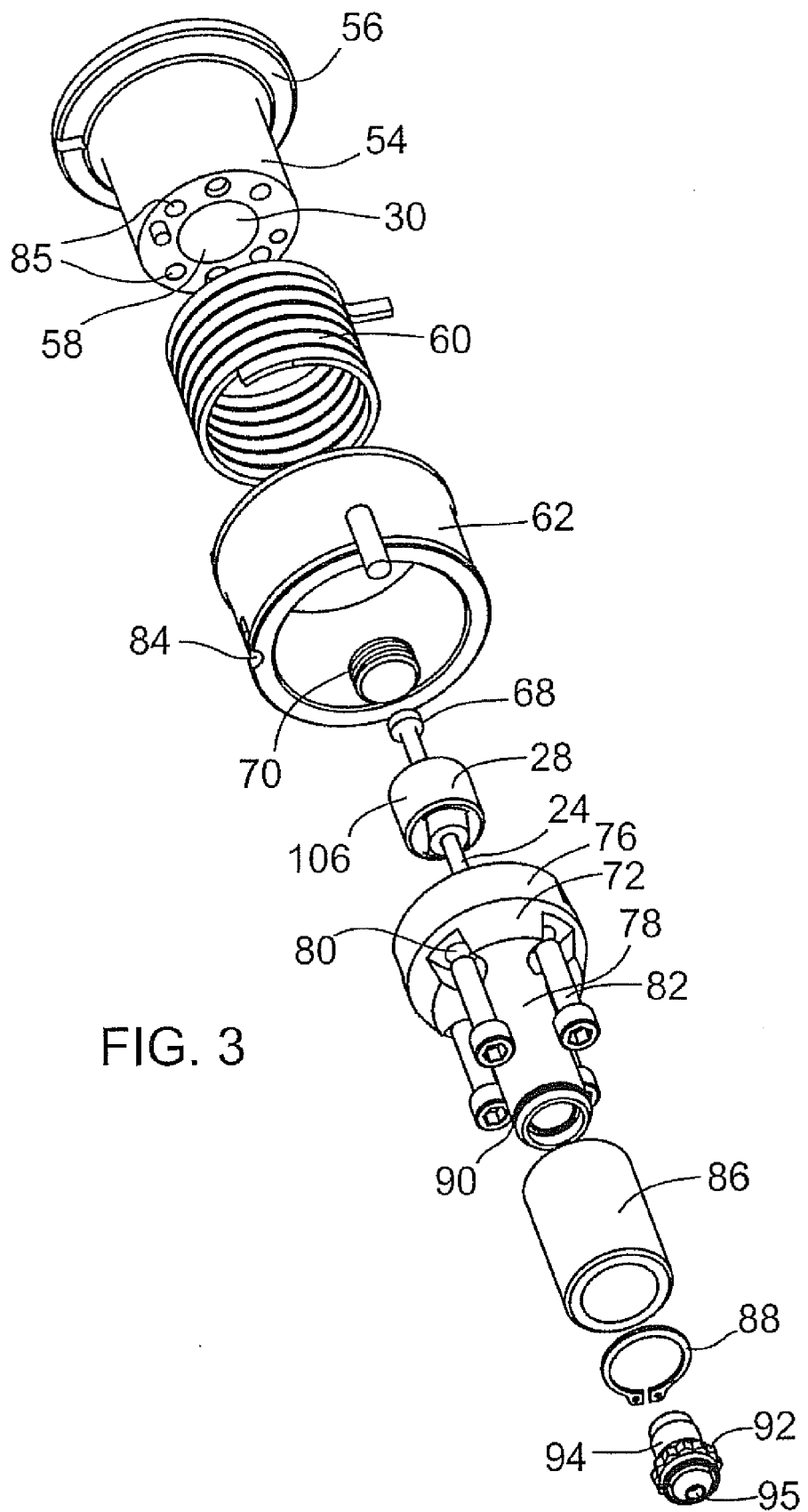
FIG. 3 is an exploded view showing the components of a nozzle valve gate used in the machine of FIGS. 1 and 2.

Turning now to the components which make up an exemplary injection apparatus for the hotrunner system, FIG. 3 shows these components separated from each other for ease of understanding. At the top of FIG. 3 is a nozzle rear body 54 formed with an end flange 56 that extends radially outwardly. Formed in this rear body is the actuator chamber 30 which has a cylindrical shape and which is surrounded by a cylindrical wall 58. There is also a coil heater 60 which can be electrically operated and which, as shown in FIG. 5, extends around the cylindrical outer wall of the rear body 54. This heater is used to maintain the rear body at the required elevated temperature for the hot plastics material flowing through the rear body. The injection apparatus further includes a spring elastic nozzle support sleeve 62 which has a cylindrical exterior and defines a cylindrical passage sized to extend about the heater 60. An opening can be provided at 64 for passage of an electrical connector 66. Located in the actuator chamber is the piston 28 which has a central axial passage into which an upper end section of the valve pin 24 extends. The exemplary pin shown has an end flange 68 which acts to hold the end of the valve pin in the piston. This end is locked in the piston by means of a set screw 70. The threads on the set screw cooperate with threads formed above the recess in the upper end of the piston to hold the set screw firmly in place. The valve pin extends through a nozzle part or shaft 72 which has a central, longitudinal guide passage 74 formed therein that guides the movement of the valve pin. The illustrated exemplary nozzle part or shaft 72 has a wider end section 76, which is adjacent the rear body 54, and a narrower nozzle section 78. The wider end section 76 is formed with a plurality of screw holes 80 through which extend longitudinally bolts 82. In the illustrated embodiment there are four of these bolts and these are threaded into holes 85 formed in the rear body 54. In this way the nozzle shaft is detachably but firmly connected to the rear body. Moreover it will be seen that this arrangement allows the nozzle shaft to be detached from the rear body from the nozzle tip end of the injection apparatus for ease of maintenance, etc.

Also shown in FIG. 3 is a cylindrical, hollow nozzle heater 86 which extends around the nozzle section 78 and is used to maintain this section at the desired elevated temperature. The heater is held in place by a heater retainer ring 88 which is a split ring which fits into groove 90 formed near the end of the nozzle section 78. Mounted in the nozzle section 78 is a nozzle tip 92 which has a threaded exterior 94. These threads engage internal threads in the nozzle section 78 for attachment of the nozzle tip. FIG. 5 shows the valve pin in the open position at which melted plastics material can flow through injection passage 20 and can flow from the aperture 95 formed in the nozzle tip into the injection mold. Forward movement of the piston will cause a corresponding downward movement of the valve pin to the closed position which is shown in FIGS. 1 and 2. In this position the flow of the plastics material from the nozzle tip is stopped completely.

Figure 4:
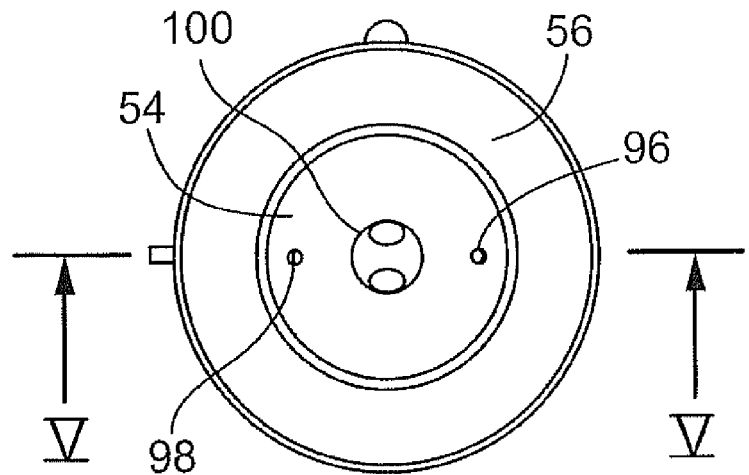
FIG. 4 is an end view of a nozzle rear body used in the nozzle valve gate of FIG. 3.

Also visible in FIG. 5 are air passageways for delivering pressurized dry air to and from the actuator chamber. These passageways are formed in the rear body or chamber forming body 54 and include a longer passageway 96 that extends from the top end of the rear body to a point adjacent the bottom end of the actuator chamber and a shorter passageway 98 that extends from the top end of the rear body to the top of the actuator chamber 30. Also visible in FIGS. 4 and 5 is an opening 100 for the flow of hot plastics material into the injection apparatus from the feed conduit 18 formed in the manifold plate. In the exemplary injection apparatus shown, an injection passage for the hot plastics material extends through the length of both the nozzle rear body 54 and the nozzle part or shaft 72. This injection passage which includes the passage 20 splits into sub-passageways 102 and 104 formed in the nozzle rear body, these sub-passageways during use of the hotrunner system diverting melted plastics material around the actuator chamber 30. In the illustrated embodiment there are two of these sub-passageways located on opposite sides of the actuator chamber. It is possible for there to be more than two sub-passageways distributed about the circumference of the chamber and it is also possible for there to be only one flow passage that extends around the actuator chamber and is formed in the cylindrical wall of the body 54.

It will be seen from FIGS. 1 and 2 that each injection apparatus including the actuator chamber 30, its piston 28 and the valve pin are mounted on a side of the manifold or manifold plate 14 facing the injection mold which is maintained at an elevated temperature for the flow of the plastics material. In addition the actuator for the valve pin including the nozzle rear body 54 and the piston are themselves at an elevated temperature because of the flow of hot plastics material through the sub-passageways in the rear body 54. Because of these elevated operating temperatures, the piston 28 and the section of the injection apparatus forming the actuator chamber 30 (that is the nozzle rear body 54) are machined to close tolerances to as to form a micro-gap between peripheral wall 106 (see FIG. 3) of the piston and the adjacent wall 58 of the actuator chamber in the range of 1-10 microns (the μm). Because of this micro-gap there is no need for fluid seals between the piston and the wall 58. As a result the nozzle device and its piston provide a valve pin actuator able to operate within plastic injection temperatures ranging between 200 and 400° C. Note the "micro-gap" referred to herein is the measured gap formed between the wall of the piston and the wall of the actuator chamber when the two walls are in contact with each other on one side of the actuator. Thus the "micro-gap" is measured at a point diametrically opposite the contact point of the two walls. It is this distance which ranges between 1 and 10 microns.

In an exemplary version of the hotrunner system, the aforementioned valve pin actuator is a pneumatic actuator operating on pressurized air, this pressurized air being delivered through gas bores 108 formed in the hotrunner manifold plate 14. A gridwork of gas bores can be seen in the transparent view of FIG. 6. These bores can include pairs of larger, parallel bores 110 that extend across the width of the manifold plate. These bores can be open at one end for connection to pressurized gas lines and can be plugged at their opposite ends, these plugs being indicated at 112. Further, longitudinally extending gas bores can be provided at 114, these bores intersecting the bores 110. The bores 114 can be connected to further pressurized air lines (not shown) at each end of the manifold plate.

Because of the provision of a micro-gap between the peripheral wall of the piston and the adjacent wall of the actuator chamber, the piston does not have a greater co-efficient of thermal expansion than the cylindrical wall 58 of the actuator chamber. In an exemplary version of the actuator, the piston and the adjacent wall of the actuator chamber have approximately the same co-efficient of thermal expansion. As shown in FIGS. 1 to 3, the piston chamber or actuator chamber 30 is a cylindrical precision bore with its open end facing towards the front piece of the nozzle, that is, the nozzle part or shaft 72. The piston and the cylindrical wall of the actuator 30 allow a low friction movement and the micro-gap between them prevents air leak and pressure drop and consequently avoids undesirable loss of valve pin force. The piston 28 and the wall 58 of the actuator chamber can be either hardened metal or ceramic. In one sample embodiment, the piston is made of tool steel or machine steel and the adjacent wall of the actuator chamber has a machined nitride surface which is harder than the peripheral wall of the piston. Alternate possible surfaces of the piston and/or the wall of the actuator chamber are surfaces with physical vapour deposition (PVD) or CVD enhancement. It will be appreciated that physical vapour deposition on the peripheral wall of the piston can provide lubricant at the high operating temperatures of the hot runner system. Also to provide desirable lubrication the wall 58 of the actuator can be impregnated with a high temperature dry lubricant in a manner known, per se. The process for providing lubricant by means of physical vapour deposition can, for example, use TiN or CrN which is deposited in a vacuum on the surface by plasma. The surface is bombarded with argon gas in an inert atmosphere.

It is also possible to construct the piston 28 of ceramic material which has a lower co-efficient of expansion. In this embodiment, the cylindrical surface of the actuator chamber can be made of tool steel. Another alternative for the piston 28 is molybdenum TZM alloy, an alloy which is 98% molybdenum and which is self-lubricating. If a piston of this material is used, the cylindrical surface of the actuator chamber can be made of tool steel which has a slightly higher co-efficient of expansion than the molybdenum alloy of the piston.

In an exemplary embodiment of the actuator for the valve pin there is at least a 10 Rockwell difference between the hardness of the piston material and the hardness of the wall of the actuator chamber. The piston 28 is made of the softer material since it is easier to replace when it becomes worn.

With respect to the air pressure required to operate the actuator of each injection apparatus, the air pressure delivered to the actuator chamber can be in the 100 to 120 PSI range, which is a standard level of pressurized air that can commonly be provided by a compressor. However if a higher level of pressurized is required for operation of the injector apparatus, the air pressure can be amplified, for example to overcome high injection pressure that is acting on the front end of the valve pin. A typical valve pin in a system such as that shown in FIGS. 1 and 2 has the diameter ranging between 2.5 and 4 mm and can be used to open and close a valve gate orifice 95 having a diameter of 1-2 mm.

FIG. 7 illustrates the front access capability of the valve gate nozzle when the mold cavity plate 34 is removed. As shown in FIG. 7, the molding machine allows the cavity plate 34 to be separated a sufficient distance from the adjacent mold plate 46 to allow ready access to the injection apparatus 16 that extend between these two plates. The same is true of the other cavity plate 32 and its adjacent mold plate 44. It will be seen that the present hotrunner system as illustrated in FIGS. 1, 2 and 7 provides accessibility from the cavity side of the mold. In other words when the cavity plate 32 or 34 is removed as shown in FIG. 7, each hotrunner nozzle on its side of the manifold has front exposure. This easy access for maintenance allows servicing the nozzle tip, the nozzle heater 86 and its thermal couple, the valve pin 24 and the valve pin actuator including the piston while the mold remains inside the machine. This access is unlike other valve pin actuators that are conventionally mounted on the side of the nozzle or entirely at the opposite backside of the manifold or even traditionally in the top clamp plate of the mold. In these prior art arrangements, access for maintenance and repairs can require the removal of the mold from the molding machine and this results in considerable downtime.

Figure 8:
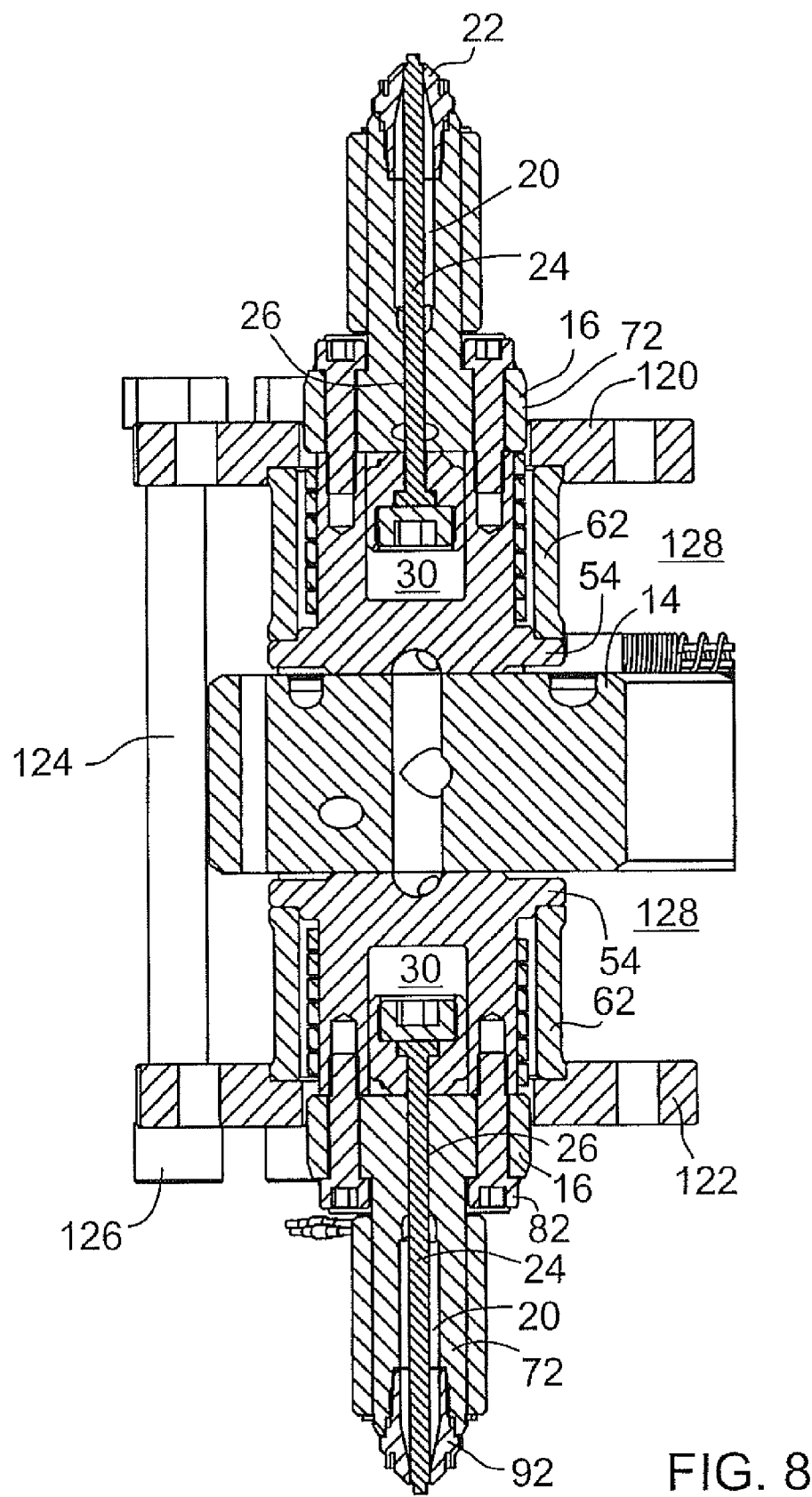
FIG. 8 is a cross-sectional view taken along the longitudinal central axes of two injection apparatus arranged on opposite sides of a manifold plate.

FIG. 8 shows an alternate construction for mounting two injection apparatus 16 in a back to back arrangement on opposite sides of a manifold plate 14. In FIG. 8 the mold cavities in which the plastic parts are formed are not shown for ease of illustration. The two injection apparatus are held securely in place on opposite sides of the manifold by two parallel mounting plates 120, 122, each of which engages an adjacent end of a respective one of the support sleeves 62. Each plate is formed with an opening having a diameter slightly larger than the maximum diameter of the nozzle shaft 72. Elongate bolts 124 and cooperating nuts 126 clamp the two plates and their respective injection apparatus 16 to the manifold plate. Only one of the bolts 124 is shown for ease of illustration. With this configuration, an air gap 128 still exists on both sides of the manifold plate.

Figure 10:
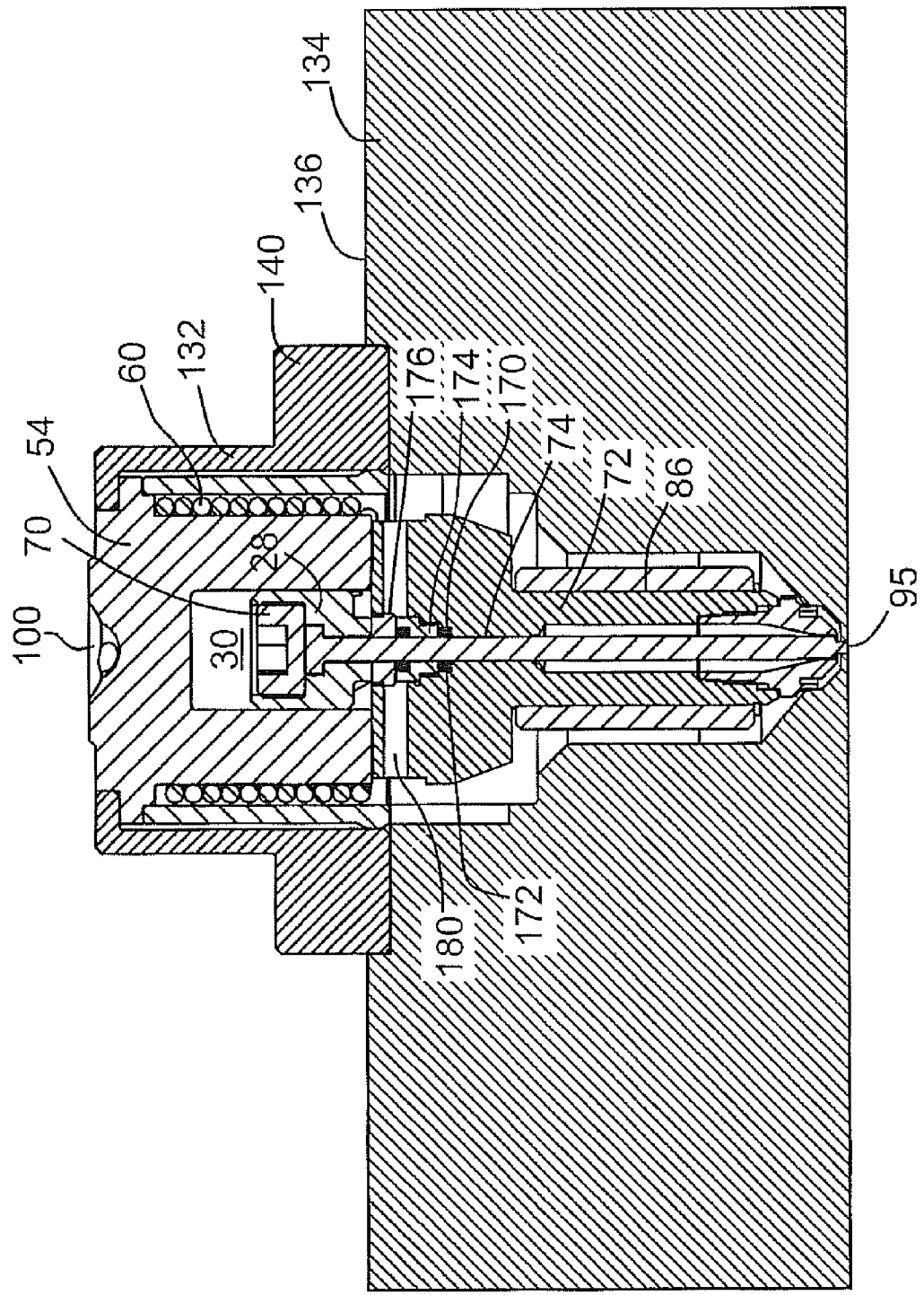
FIG. 10 is a cross-sectional view taken along the line X-X of FIG. 9 with a portion of the left side of the cavity plate broken away for ease of illustration.
Figure 11:
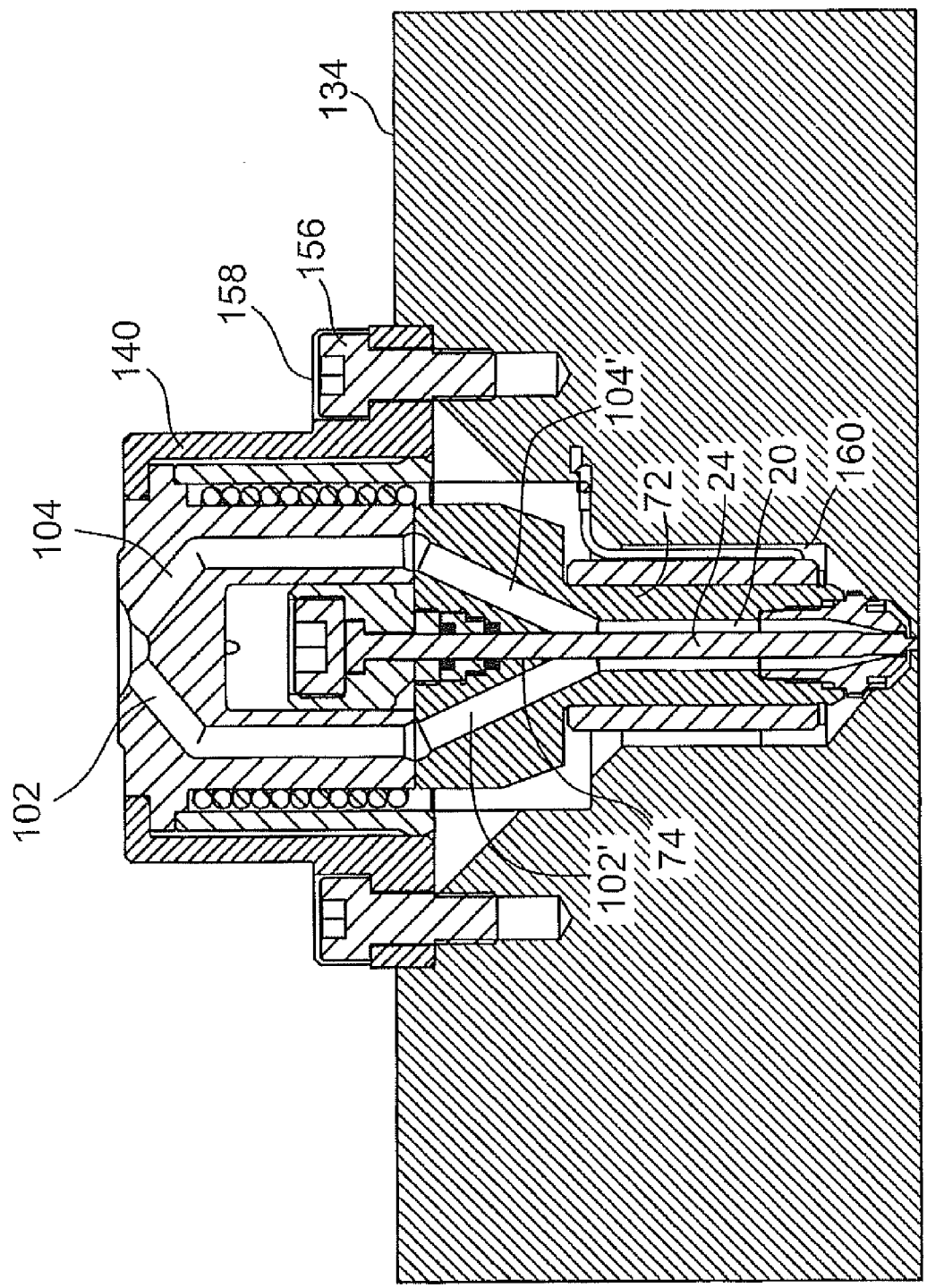
FIG. 11 is another cross-sectional view taken along the line XI-XI of FIG. 9.
Figure 12:
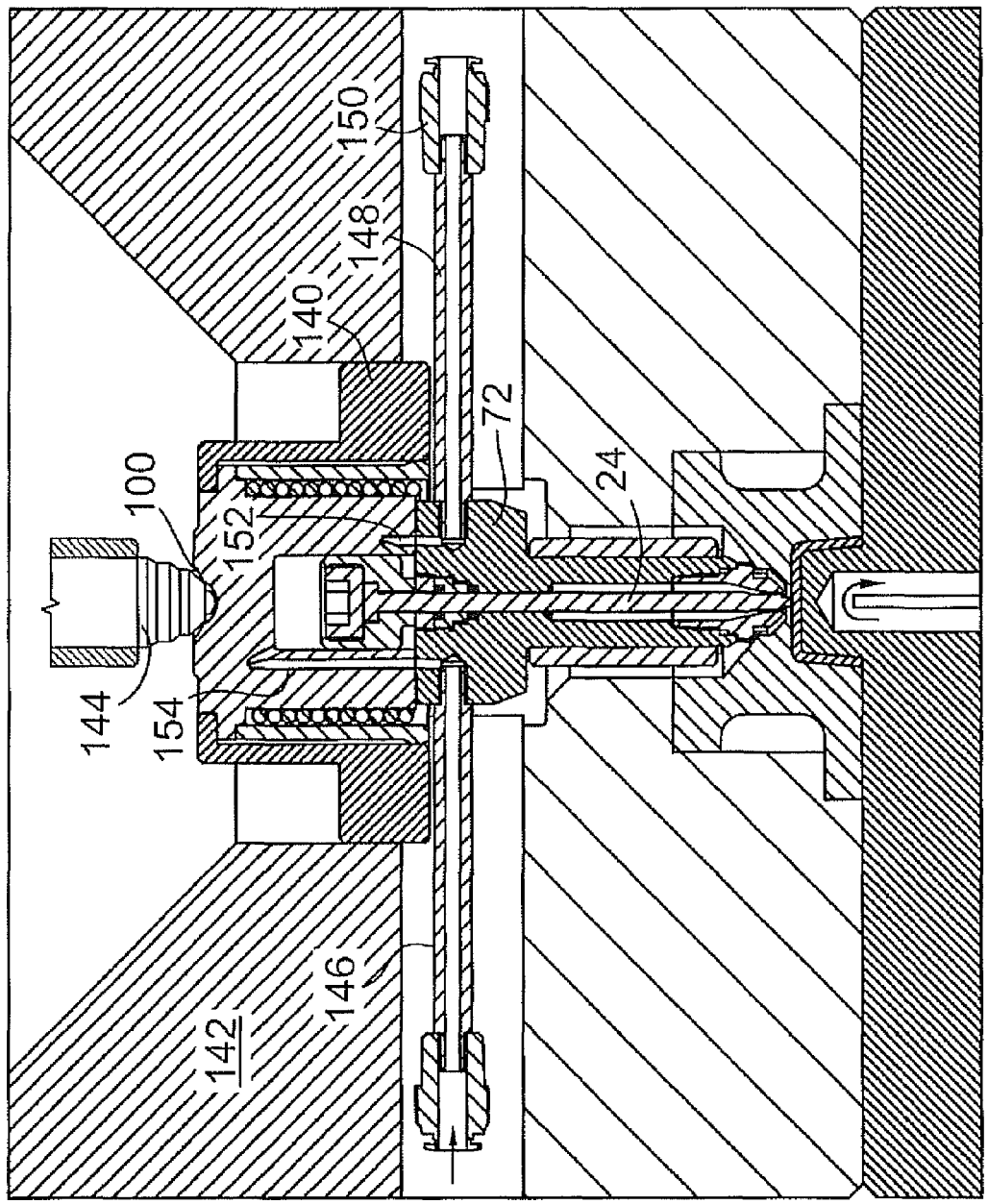
FIG. 12 is a further cross-sectional view taken along the line XII-XII of FIG. 9.

FIGS. 9 to 12 illustrate another embodiment of the present disclosure wherein the molding apparatus has only a single valve gate nozzle or injection apparatus which is not attached to a melt distribution manifold. This nozzle valve gate apparatus, which is indicated generally at 130, is suitable for injecting hot plastics material into an injection mold for molding a plastics product or part. The drawings illustrate a nozzle valve gate 132, a bottom section of which is mounted in a cavity plate 134 of rectangular shape. The plate has a top surface 136 in which is formed a cavity for receiving the nozzle valve gate. A bottom surface of the gate is formed with an orifice 95 that can be opened or closed by the valve pin 24. As in the embodiment of FIGS. 3 to 5, the nozzle valve gate has a nozzle rear body or chamber forming body 54 which forms an actuator chamber 30. A piston 28 is slidably mounted in this chamber and is connected to the top end of the valve pin using a threaded set screw 70. An electric coil heater 60 extends around the rear body and another electric heater 86 extends around the nozzle shaft 72 which forms a guide passageway for the valve pin. The nozzle valve gate or injection apparatus is bolted to the plate 134 by means of a mold locating ring 140 through which extends a top section of the nozzle rear body 54. As shown in FIG. 12, the mold locating ring 140 fits snugly within a counterbore formed in a machine clamp plate which is maintained at a relatively cool temperature. Also illustrated in FIG. 12 is the lower portion of a machine nozzle of the molding machine, this machine nozzle being indicated at 144. The outlet of the machine nozzle injects hot plastics material into the top opening 100 of the injection nozzle.

Pressurized air to move the piston 28 in the actuator chamber is provided through two elongate pipes or air lines 146, 148, each provided with a fitting 150 for attachment purposes. The air line 148 is operatively connected to internal gas passage 152 which is relatively short and delivers air to the bottom side of the piston. The other air line 146 is operatively connected to a longer internal gas passage 154 which is able to deliver air to the topside of the piston. Each air line can be provided with a reduced diameter end section which is externally threaded for connecting the air line to the nozzle shaft 72. The pressurized air flow through the air lines 146, 148 is controlled by five/three position solenoid valves of known construction. Pressurized gas is delivered through the air line 148 in order to move the valve pin to the open position allowing plastics melt to be injected into the mold cavity. Air at the top of the actuator chamber can escape from the chamber through the air line 146. In order to close the valve gate, pressurized air is delivered through the air line 146 to the top end of the actuator chamber which causes the valve pin to move to the closed position.

Figure 9:
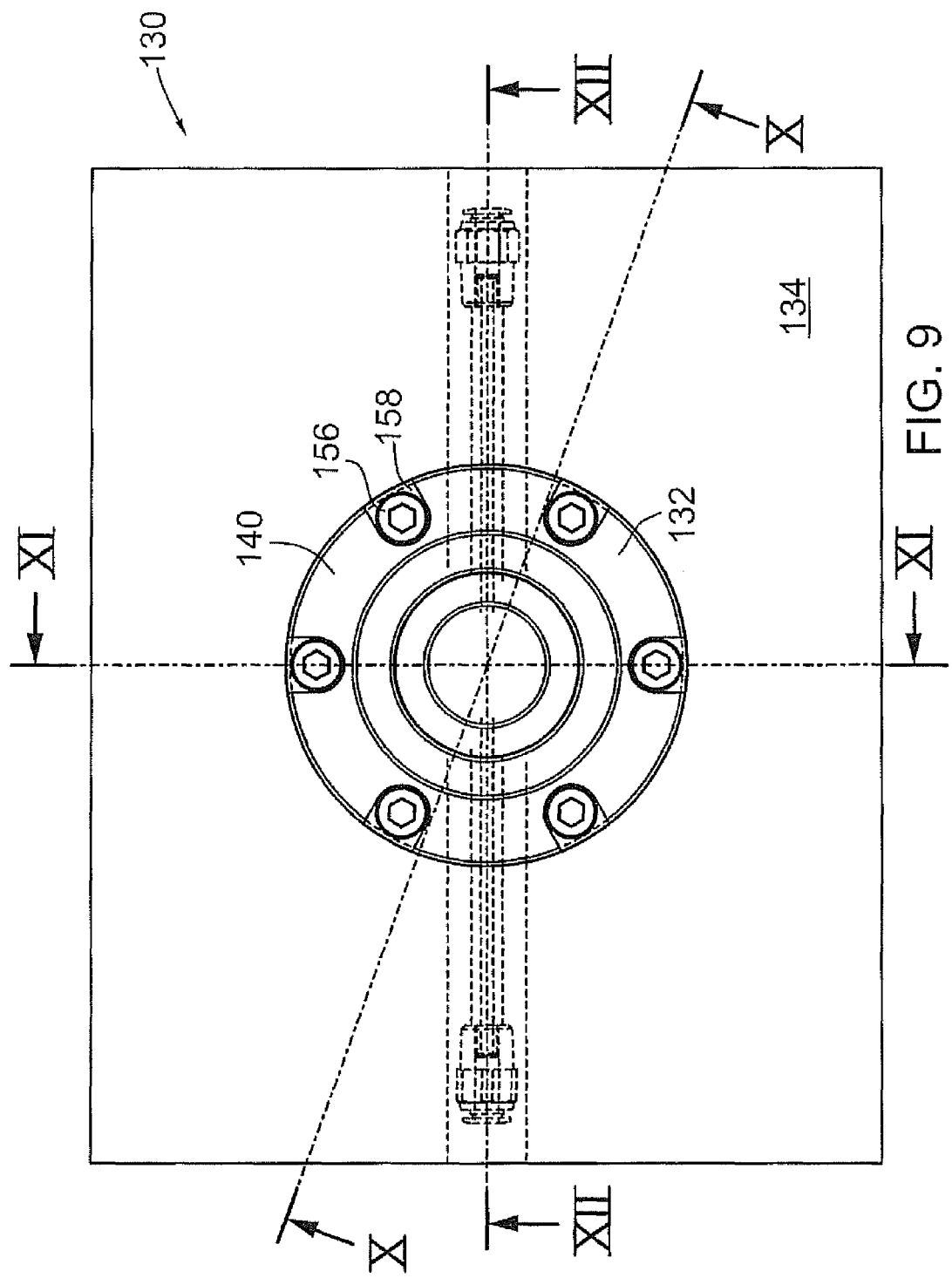
FIG. 9 is a top view of another embodiment of an injection apparatus, this view showing the top of a nozzle valve gate actuator and the cavity plate in which the valve gate is mounted.

With reference now to FIGS. 9 and 11, there are shown therein mounting screws 156 which are used to detachably connect the mold locating ring 140 to the cavity plate 134. In the illustrated embodiment, there are six of these mounting screws and the head of each screw is located in a screw recess 158 formed in the mounting flange that extends around the locating ring 140.

Shown also in FIG. 11 is the plastics injection passage system that extends through the valve gate nozzle. As in the embodiment of FIGS. 1 and 2, the injection passage splits into two sub-passageways 102, 104 in the actuator section of the valve gate nozzle. These two sub-passageways are located on opposite sides of the actuator chamber 30 and are located in the wall forming the actuator chamber. In the nozzle shaft 72, these two sub-passageways converge at 102' and 104'. The converging sections meet at the annular passage 20 that surrounds the valve pin. It is also possible to have only one passageway extending around one side of the actuator chamber. Also visible in FIG. 11 is a thermal couple 160 which is used to monitor the temperature of the nozzle shaft in a manner known per se. Thermal couples can be provided elsewhere on the valve gate as well in a manner known per se.

Shown in FIGS. 10 to 12 is a wiper seal assembly indicated generally at 170. This assembly through which the valve pin 24 extends is mounted in the top end of the nozzle shaft 72. The wiper seal assembly can include one seal ring 172 or several seal rings that are held in position in a counterbore and in a retainer housing 174 by a set screw 176. The set screw is threaded into an opening formed in the top of the nozzle shaft 72 so as to engage the top of the retainer housing 174. The purpose of the wiper seal assembly is to provide a zero gap precision fit with the valve pin which is slidable therein. The wiper seal provides a tight fitting seal that allows the valve pin to move in the axial direction between the open and closed positions while at the same time preventing leakage of plastics melt past the seal. Because the wiper seal is installed in a high temperature operating environment inside the heated nozzle body, the seal is selected to withstand the plastic processing temperature of thermal plastics material normally ranged between 200° C. and 300° C. (309° F. to 575° F.). The selected seal or seals desirably provide good lubricity, elasticity and a temperature resistance of more than 300° C. A suitable material for the wiper seal is polyimide with molybdenum disulfide filler or polytetrafluoroethylene (PTFE) with boron nitrite filler. A wiper seal of this material can have a temperature rating of 600° F. for long term use and up to 900° F. for medium term use. Thus such seals are suitable for the entire processing temperature range of standard thermoplastic materials. It will be understood that the wiper seal assembly 170 can also be used around the valve pins in the hotrunner system of FIGS. 1 and 2. Possible base materials for the wiper seal include a high temperature resistant polymer such as PI (polyimide), PEI (polyether ether imide), or PEEK (polyether ether ketone) with the base material containing a filler to reduce friction. A typical filler for this purpose is the aforementioned PTFE or molybdenum disulfide ($MoS_2$). The elastomeric wiper seal can be installed in its holding cavity by being pushed in under a pre-load. The internal diameter of this seal can be five to ten microns smaller than the diameter of the pin, thus insuring no gap between the pin and the seal. The wiper seal will expand as it is heated but is able to permit the required pin movement.

As indicated the valve pin movement is guided in the nozzle shaft by a guide passage 74. In an exemplary embodiment of the valve gate this guide passage is formed by a machined bore made to close tolerances so that a micro-gap is formed between the valve pin 24 and the machined bore. This micro-gap which can be in the order of several microns may allow polymer molecules, pigments and gases to escape to the outside of the passageways provided for the flow of hot plastics material. This is due to the high temperature of the hot plastics melt, the high injection pressure used to deliver the plastics melt to the valve gate and the valve pin stroke. This escape of material can cause over time maintenance issues inside the injection mold, but this escape can be prevented by the use of the above described wiper seal assembly. As with the micro-gap between the piston and the actuator chamber wall, the micro-gap between the valve pin and the machined bore is measured with the pin and bore contacting each other on one side. The micro-gap is the distance between the side of the pin and the bore at the point diametrically opposite the contact point.

In addition to the provision of the micro-gap between the pin and the guide passage wall and the provision of the wiper seal assembly, a transversely extending additional passage 180 can be provided in the nozzle shaft 72 near its upper end. As shown in FIG. 10, this additional passage intersects the guide passage (including the guide passage that extends through the wiper seal assembly) at a location spaced from the actuator chamber 30. The passage 180 allows gases or plastics melt residue that has entered into the bore to escape. The passage 180 can be described as a decompression bore. It should be noted that it is also possible to employ this decompression bore even in a valve gate nozzle having no wiper seal assembly that extends about the valve pin. Note also that pressurized air in the actuator chamber itself can pass through the micro-gap around the valve pin (particularly in the case where no wiper seal assembly is used) and the escaping air flow provides self-cleaning of the annular gap that extends between the actuator chamber and the passage 180. Note that the micro-gap around the valve pin in an exemplary embodiment of the valve gate nozzle is between one and ten microns and is dependent in part on the diameter of the pin itself.

Figure 13:
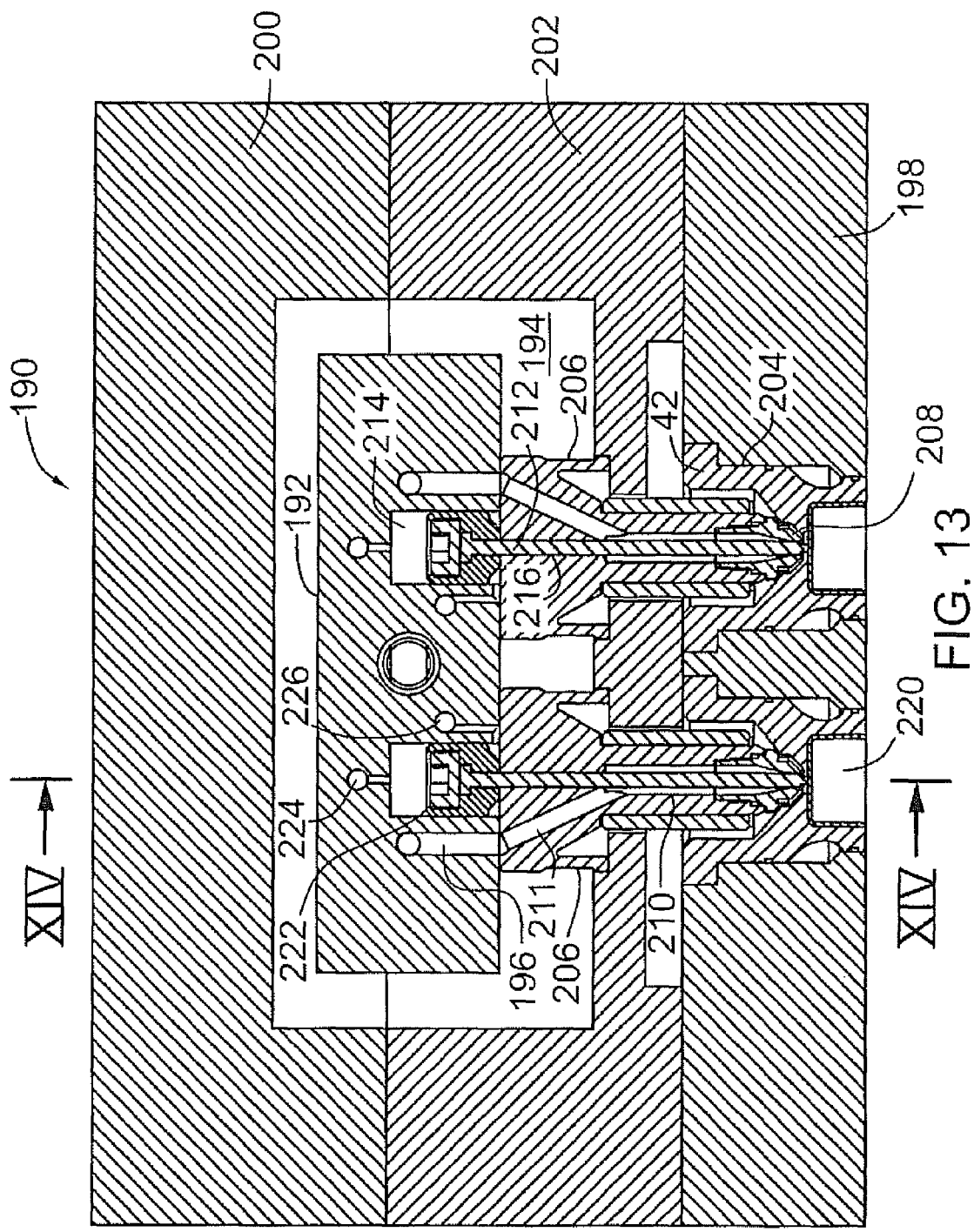
FIG. 13 is a longitudinal cross-sectional view of another embodiment of a hotrunner molding machine, this embodiment having actuator chambers located in the manifold.
Figure 14:
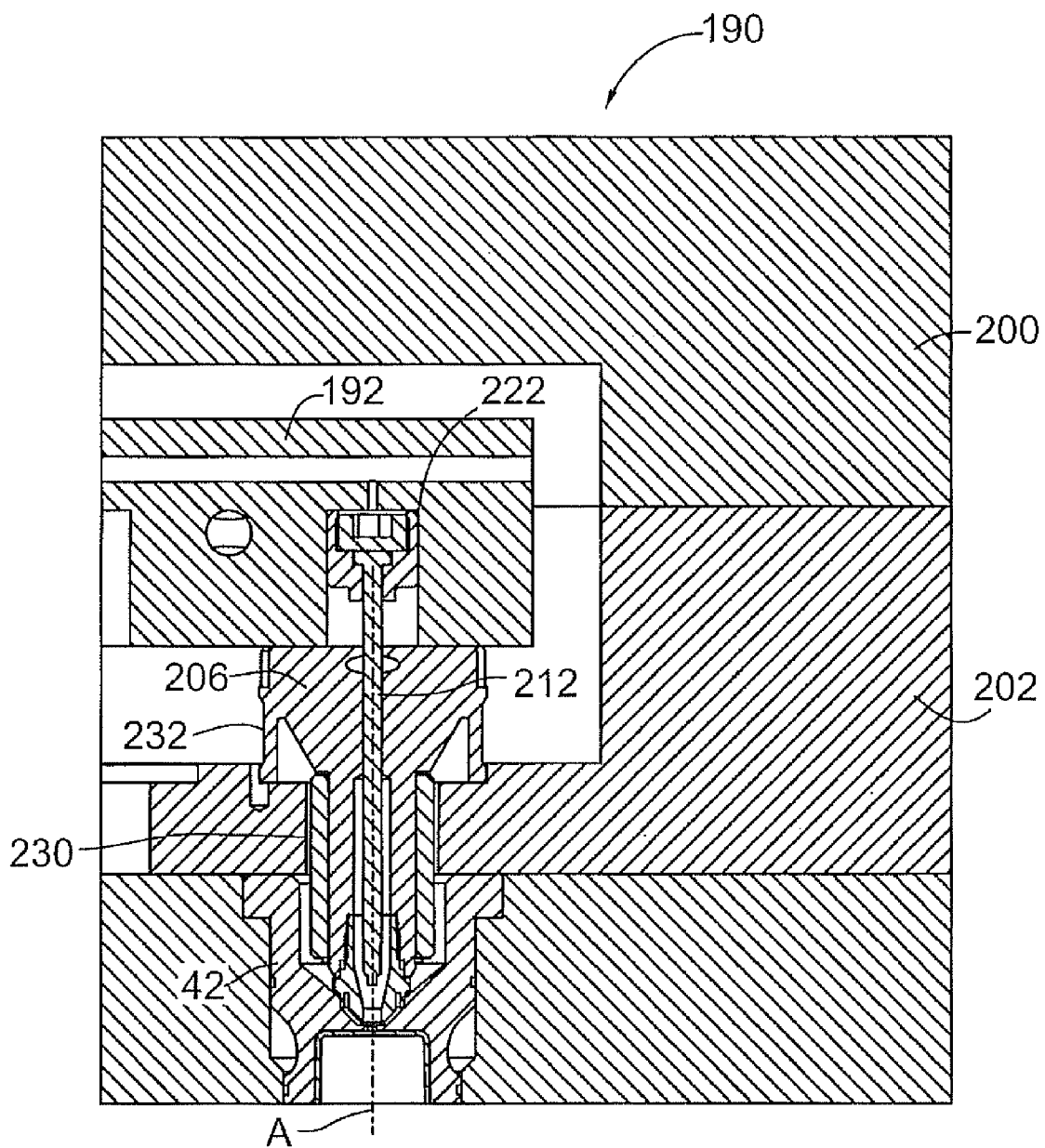
FIG. 14 is a transverse cross-section of the molding machine of FIG. 13, this view being taken along the line XIV-XIV of FIG. 13.

FIGS. 13 and 14 illustrate another form of hotrunner system constructed in accordance with the present disclosure. This hotrunner system, which is indicated generally by reference 190, has a centrally located manifold plate 192 which is located in an air containing cavity 194. Again, this manifold has an inlet for receiving melted plastics material from a plasticizer unit (not shown) and a plastics feed conduit 196 connected to this inlet. As in the above described versions of hotrunner systems, the manifold is adapted for operation at a desired elevated temperature suitable for the flow of the melted plastics material through the manifold without undesirable degradation. The hotrunner system has a mold cavity plate 198 and two manifold mold plates 200, 202 which are held against one another under pressure applied by the mold machine. The cavity 194 is formed between the two mold plates, only portions of which are shown in FIG. 14. The mold cavity plate is formed with two or more stepped cavities 204 in each of which is mounted a portion of a respective one of injection apparatus in the form of nozzle members 206. In this particular hotrunner system 190, there are two or more nozzle members 206 mounted on one side of the manifold plate 192 and each has a longitudinal axis indicated at A in FIG. 14. Each nozzle member has an injection passage operatively connected to a respective outlet of the feed conduit of the manifold and extending to a nozzle tip 208. A section of this passage which surrounds a bottom portion of a valve pin can be seen at 210. This portion, which extends along the longitudinal axis A, is connected to a sloping passage section 211 of which there is only one in this version of the nozzle member. An elongate valve pin 212 extends the length of its respective nozzle member and also extends into the manifold 192 in which are formed actuator chambers 214. As in the previous embodiments, each valve pin extends through a respective guide passage 216 and is movable therein between an open position (shown in FIG. 14) at which melted plastics material can flow from the respective nozzle tip into an injection mold 220 and a closed position (shown in FIG. 13) which stops flow from the nozzle tip.

This hotrunner system also has a plurality of pistons 222, each connected to a rear end of a respective one of the valve pins, slidably mounted in an associated one of the actuator chambers 214, and adapted to move the respective valve pin between the open and closed positions by means of fluid pressure in the associated actuator chamber. Pressurized air can be delivered through the manifold to the actuator chamber through air passageways indicated at 224 and 226.

Because of the high operating temperature of the manifold plate 192, it is necessary to avoid the use of seals between the peripheral wall of each piston and the surrounding cylindrical wall of the actuator chamber formed in the manifold. Accordingly, the pistons 222 and the cylindrical walls forming the actuator chambers are machined to close tolerances so as to form a micro gap between a peripheral wall of each piston and the adjacent cylindrical wall in the range of 1 to 10 microns. In this way, each piston 222 and its associated actuator chamber 214 provide a valve pin actuator able to operate within plastic injection temperatures ranging between 200° C. and 400° C. In the exemplary illustrated version of the hotrunner system, the actuators in the manifold are pneumatic actuators operated by pressurized air or a suitable gas.

In an exemplary form of this hotrunner system, each guide passage 216 comprises a machined bore and a micro gap is formed between each valve pin 212 and its respective machined bore. As explained above, the provision of such a micro gap helps to prevent hot melted plastics material in the respective nozzle member from passing through the micro gap into the adjacent actuator chamber under normal operating conditions. Although not shown in FIGS. 13 and 14, this hotrunner system 190 can be further enhanced by providing a wiper seal adjacent to or along the guide passage 212, the construction of this wiper seal being similar to that described above in connection with the wiper seal assembly 170 of FIG. 10.

With particular reference to FIG. 14, it will be seen that each nozzle member 206 is clamped between and held in position by the manifold plate 192 and the mold plate 202. A circular opening can be provided at 230 in the mold plate and the nozzle member extends through this opening. The nozzle member has a wider rear section 232 which fits snugly into an annular recess formed on an inner surface of a mold plate. The narrower section of the nozzle member extends into its respective mold insert 42, which is mounted in the stepped cavity 204.

Figure 15:
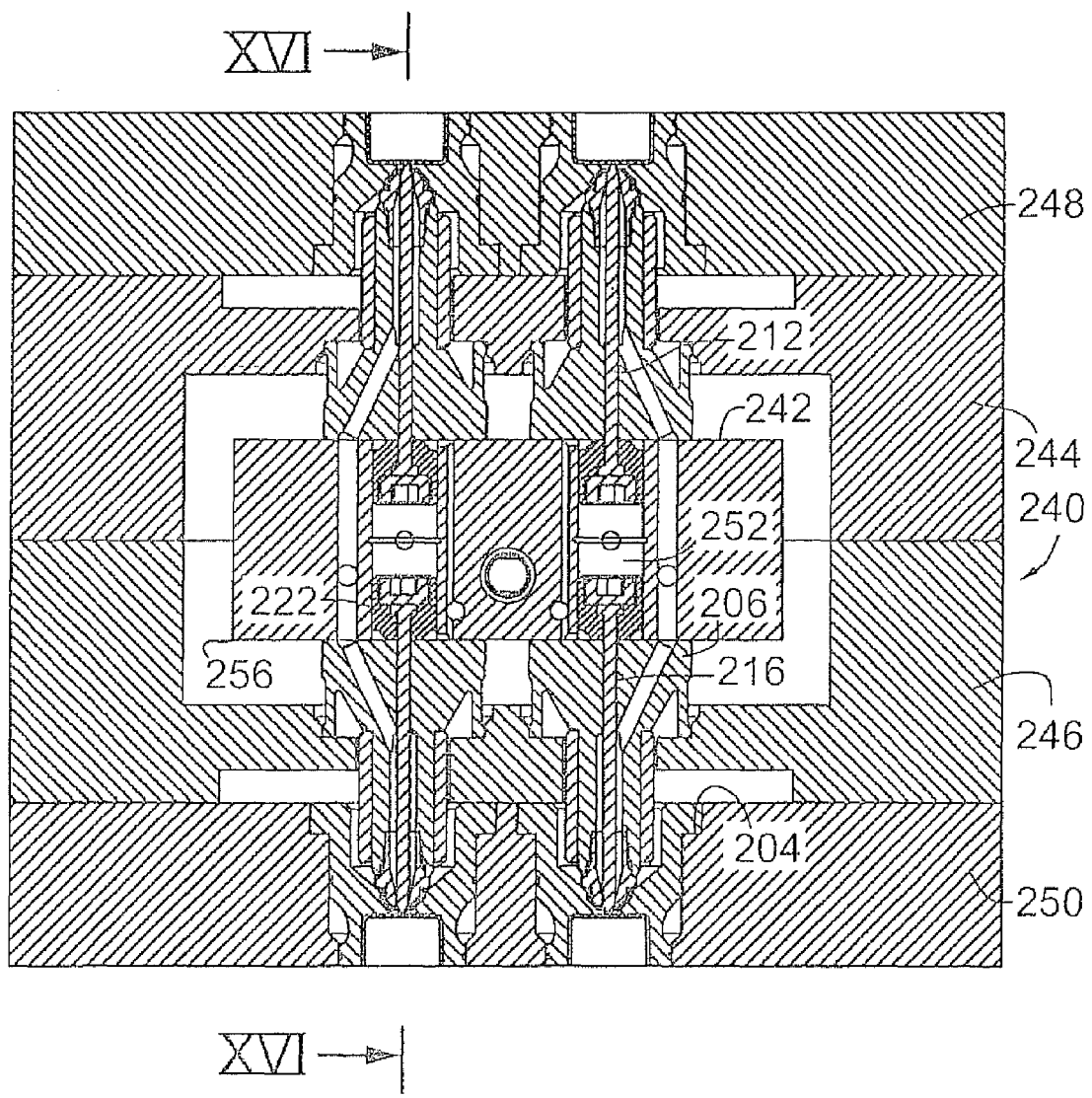
FIG. 15 is a longitudinal cross-sectional view of a further embodiment of a hotrunner molding machine, this embodiment being similar to that of FIG. 13 but having nozzle members mounted on opposite sides of the manifold.
Figure 16:
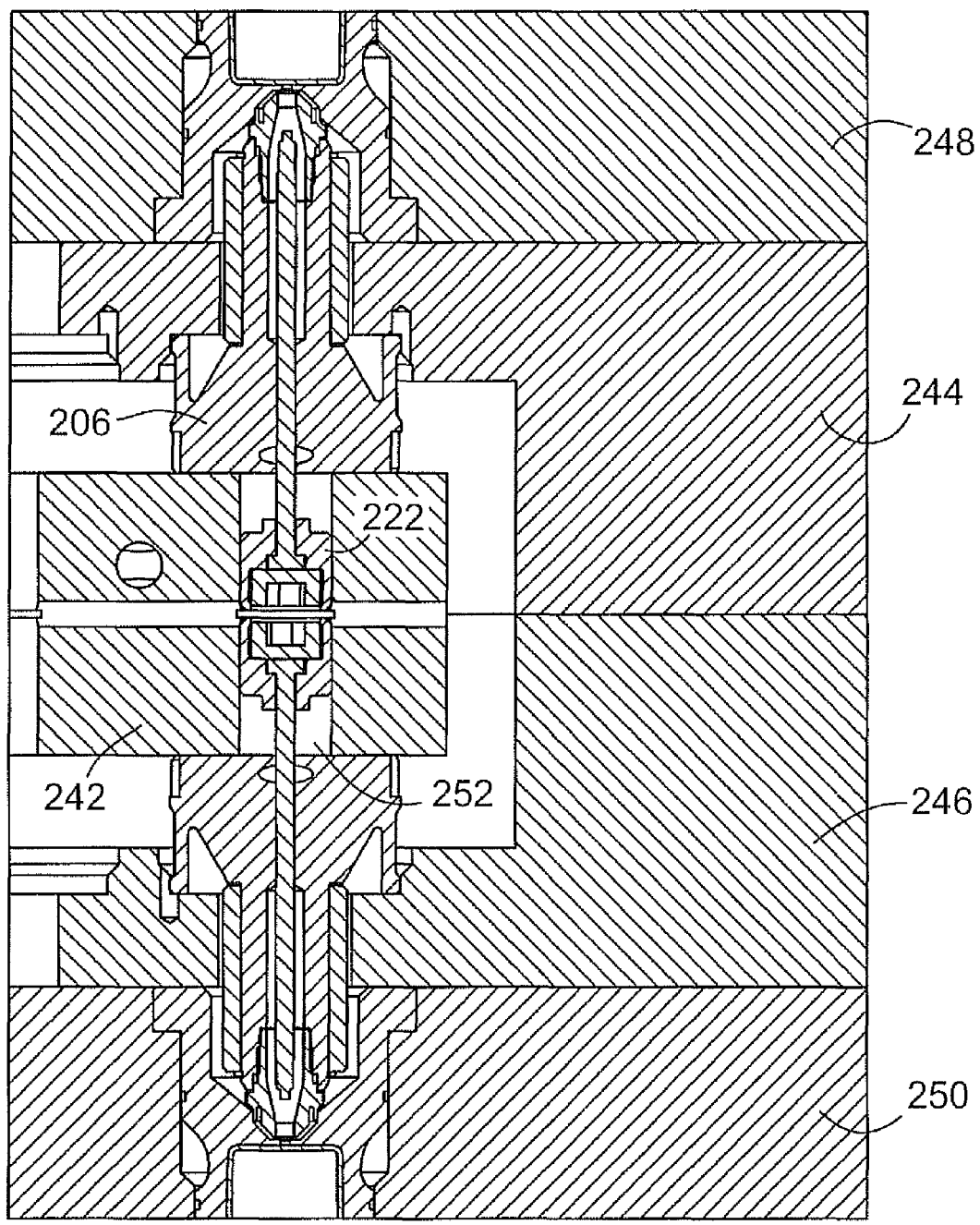
FIG. 16 is a transverse cross-section of one side section of the molding machine of FIG. 15, this view being taken along the line XVI-XVI of FIG. 15.
Figure 17:
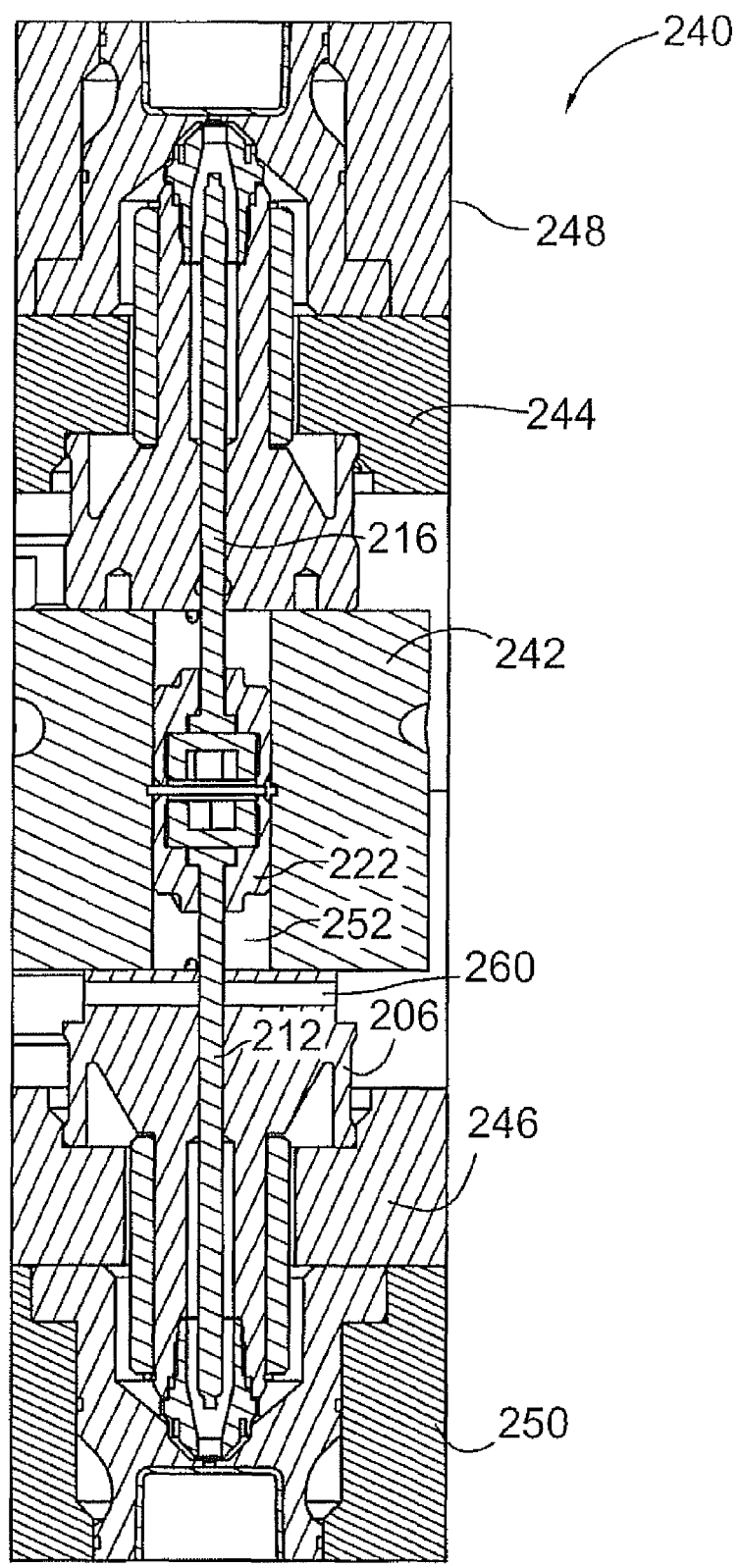
FIG. 17 is another cross-section of the molding machine of FIGS. 15 and 16, this view showing a transverse passage intercepting one of the machined bores for the valve pins.

FIGS. 15 to 17 illustrate yet another form of hotrunner system constructed in accordance with the present disclosure, this system being indicated generally at 240. This system can be constructed in a manner similar to the above described hotrunner system 190 shown in FIGS. 13 and 14 except for the differences noted hereinafter. This hotrunner system has a central manifold plate 242, which is mounted in a central air cavity formed by manifold mold plates 244 and 246. The hotrunner molding machine of FIGS. 15 to 17 has two cavity plates 248, 250, each of which is formed with a plurality of stepped cavities 204. In each cavity is mounted a portion of a nozzle member 206. The manifold mold plates are held against one another and the pressure applied through the two cavity plates.

As in the previous embodiment, the manifold plate 242 forms a plurality of actuator chambers 252. A plurality of pistons 222 are mounted in these actuator chambers and each of these are connected to the rear end of a respective valve pin 212.

It will be seen that in the embodiment of FIGS. 15 to 17, unlike that of FIGS. 13 and 14, the nozzle members 206 are mounted on two opposite sides of the manifold, these sides being indicated at 254 and 256. Each nozzle member 206 on one side is aligned in a back-to-back manner with a respective nozzle member on the opposite side and a single large actuator chamber 252 can be provided for each pair of pistons 222 for the aligned nozzle members. Thus, it will be appreciated that the aligned valve pins of each pair of aligned nozzle members move simultaneously between their respective open and closed positions. Alternatively, a separate actuator chamber can be formed in the manifold for each of the pistons 222.

As in the embodiment of FIGS. 13 and 14, in the exemplary form of the hotrunner system 240, each valve pin is movable in a longitudinal guide passage 216, which is in the form of a machined bore. A micro gap is formed between each valve pin and its respective machined bore so that, under normal hotrunner system operating conditions, hot melted plastics material in each nozzle member is prevented from passing through the micro gap into the adjacent actuator chamber.

FIG. 17 shows another cross-section of the hotrunner system 240. An additional detail shown in this cross-section is the provision of the additional passage 260 formed in each nozzle member 206 close to the end of the nozzle member that is pressed against the manifold plate. This transverse passage serves the same purpose as the passage 180 in the injection apparatus of FIG. 10. As shown, the additional passage intersects the guide passage 216 and it allows gasses or plastic melt residue that has entered into the guide passage to escape, in other words this passage serves as a decompression bore. FIG. 17 illustrates how such a decompression bore can be used in a valve gate nozzle, which has no wiper seal assembly adjacent the guide passage 216. Also pressurized air in the actuator chamber 252 can pass through the micro gap around the valve pin. Any such escaping air provides self-cleaning of the annular gap that extends between the actuator chamber and the passage 260. It is also, of course, possible to provide a wiper seal in the hotrunner system 240 adjacent the guide passage for each valve pin.

The machined cylindrical wall for each actuator chamber 252 can also be provided with a hardened surface in the manner described above. In particular, the wall of the actuator chamber 214, 252 can have a machined nitride surface, which is harder than the peripheral wall of the piston. Alternate possible surfaces of the piston and/or the wall of the actuator chamber formed in the manifold plate are surfaces with physical vapour deposition (PVD) or CVD enhancement. Also the cylindrical walls of the actuator chambers in the manifold plate can be impregnated with a high temperature dry lubricant in a manner known per se as explained above.

It will be appreciated by those skilled in the art that one advantage of the two embodiments shown in FIGS. 15 to 17 wherein the actuator chambers are formed in the manifold plate is that the stack height of the manifold and nozzle assembly is more compact and this allows for a more compact injection mold. A reduced mold stack height benefits the opening stroke of the mold for the injection of the plastic part. This is especially important for stack molds with two or more mold parting surfaces and molds with long parts in molding machines with unlimited travel of the machine opening stroke between the mold clamp platens.

While the present invention has been illustrated and described as embodied in exemplary embodiments, e.g. embodiments having particular utility for injection apparatus and machines for injecting plastics material from a plasticizer unit into an injection mold, it is to be understood that the present invention is not limited to the details shown herein, since it will be understood that various omissions, modifications, substitutions and changes in the forms and details of the disclosed systems and nozzle valve gates and their operation may be made by those skilled in the art without departing in any way from the spirit and scope of the present invention. For example, those of ordinary skill in the art will readily adapt to present disclosure for various other applications without departing from the spirit or scope of the present invention.

We claim:

1. A hotrunner system for injecting plastics material from a plasticizer unit into an injection mold for molding plastic devices or parts, said system comprising:

a hotrunner manifold having an inlet for receiving melted plastics material from said plasticizer unit and a plastics feed conduit connected to said inlet, said manifold being adapted for operation at a desired elevated temperature suitable for flow of said melted plastics material through said manifold without undesirable degradation; and at least one injection apparatus operatively connected to a downstream end of said feed conduit, the or each injection apparatus having a nozzle device having a longitudinal axis and a longitudinal injection passage extending to a nozzle tip, an elongate valve pin extending through a longitudinal guide passage formed in the nozzle device and movable in the passage in the direction of said longitudinal axis between an open position at which said melted plastics material can flow from the nozzle tip into the injection mold and a closed position to stop the flow of said plastics material from the nozzle tip, and a piston connected to a rear end of said valve pin, slidably mounted in an actuator chamber formed in said nozzle device, and adapted to move said valve pin between said open and closed positions by means of fluid pressure in said actuator chamber during use of the hotrunner system, the or each injection apparatus including the actuator chamber, its piston and the valve pin being mounted on or in a side of said manifold facing said injection mold, said piston and a section of the injection apparatus forming said actuator chamber being machined to close tolerances so as to form a micro gap between a peripheral wall of the piston and the adjacent wall of the actuator chamber in the range of 1 to 10 μm, thereby avoiding fluid seals between said piston and said wall of the actuator chamber, wherein the or each nozzle device and its piston provide a valve pin actuator able to operate within plastic injection temperatures ranging between 200 and 400° C.

2. A hot runner system according to claim 1 wherein the or each valve pin actuator is a pneumatic actuator, gas bores are formed in said hotrunner manifold for delivering pressurized air or gas to or from the or each actuator chamber, and said piston and the adjacent wall of the actuator chamber have approximately the same co-efficient of thermal expansion.

3. A hotrunner system according to claim 2 wherein said nozzle device includes a nozzle rear body forming said actuator chamber and a nozzle shaft detachably connected to one end of said nozzle rear body, said injection passage extending through the length of both said nozzle rear body and said nozzle shaft.

4. A hotrunner system according to claim 3 wherein said injection passage splits into sub-passageways formed in said nozzle rear body, these sub-passageways during use of the hotrunner system diverting the melted plastics material around said actuator chamber.

5. A hotrunner system according to claim 1 wherein said guide passage includes an elongate machined bore and a further micro gap is formed between said valve pin and said machined bore, said further micro gap under normal hotrunner system operating conditions preventing hot melted plastics material in the nozzle device from passing through the further micro gap into said actuator chamber.

6. A hotrunner system according to claim 5 wherein said nozzle device is formed with a transversely extending additional passage that intersects said machined bore at a location spaced from said actuator chamber, said additional passage being provided to allow any gases or plastics melt residue that has entered said machine bore to escape.

7. A hotrunner system according to claim 2 wherein there are a first plurality of said at least one injection apparatus mounted in or on a first side of said manifold and there are a second plurality of said at least one injection apparatus mounted in or on a second side of said manifold which is opposite said first side.

8. A hotrunner system according to claim 1 wherein said piston is made of tool steel and said adjacent wall of the actuator chamber has a machined nitride surface which is harder than said peripheral wall of the piston.

9. A hotrunner system according to claim 1 wherein said adjacent wall of the actuator is impregnated with a high temperature dry lubricant.

10. A hotrunner system according to claim 1 wherein said peripheral wall of the piston has a physical vapour deposition thereon which provides lubricant at the high operating temperatures of said hot runner system.

11. An injection apparatus for delivering and injecting hot plastics material into an injection mold for molding a plastic product or part, said injection apparatus comprising:
a chamber forming body having first passage means for flow of said hot plastics material from a plastics inlet provided in said body through the body to at least one plastics outlet, said body forming an actuator chamber;
a nozzle part connected to said body and having a longitudinal axis, said nozzle part extending in the longitudinal direction to a nozzle tip having an injection aperture for said hot plastics material to flow into said injection mold, said nozzle part having second passage means operably connected to said at least one plastics outlet for conducting said hot plastics material through said nozzle part to said injection aperture;
an elongate valve pin extending through a longitudinally extending guide passage formed in said nozzle part and movable in the guide passage in said longitudinal direction between an open position at which said hot plastics material can flow through said injection aperture into the injection mold and a closed position which stops flow of the plastics material through the injection aperture; and
a piston connected to a rear end of said valve pin, slidably mounted in said actuator chamber, and adapted to move said valve pin between said open and closed positions by means of fluid pressure in said actuator chamber during use of the injection apparatus,
said piston and said body being machined to close tolerances so as to form a micro gap between a peripheral wall of the piston and an adjacent wall of said actuator chamber thereby avoiding fluid seals between said piston and said adjacent wall of the actuator chamber,
wherein the chamber forming body and piston together provide an actuator for said valve pin to operate within plastics injection temperatures between 200° C. and 400° C.

12. An injection apparatus according to claim 11 wherein said first passage means splits into at least two sub-passageways in said body and said at least two sub-passageways are distributed around a wall of said body forming said actuator chamber.

13. An injection apparatus according to claim 11 including two elongate pipes each having one end connected to said nozzle part and operatively connected to internal gas passages formed in said body and said nozzle part, wherein said pipes and said gas passages provide means for transferring pressurized air or gas to and from said actuator chamber in order to move said piston and the valve pin between the open and closed positions.

14. An injection apparatus according to claim 11 wherein said guide passage includes a machined bore, a further micro gap is formed between said valve pin and said machined bore, and said further micro gap under normal operating conditions of the injection apparatus substantially prevents hot melted plastics material in said nozzle part from passing from said second passage means through the further micro gap and into said actuator chamber.

15. An injection apparatus according to claim 11 wherein said piston is made of tool steel and said body has a machined nitride surface forming a cylindrical wall of the actuator chamber which is harder than said tool steel.

16. An injection apparatus according to claim 11 wherein said body forms a cylindrical wall of the actuator chamber and said cylindrical wall is impregnated with a high temperature dry lubricant.

17. An injection apparatus according to claim 11 wherein said micro gap is in the range of 1 to 10 μm.

18. An injection apparatus for delivering and injecting hot plastics material into an injection mold for molding a plastics product or part, said injection apparatus comprising:
- a metal body forming an actuator chamber having a machined cylindrical wall;
- a nozzle member connected to said body and having a longitudinal axis, said nozzle member extending in the longitudinal direction to a nozzle tip having an injection aperture for said hot plastics material to flow into said injection mold, said nozzle member forming a guide passage comprising a machined bore and forming injection passage means for conducting said hot plastics material through the nozzle member to said injection aperture;
- a valve pin extending through said guide passage and movable therein in said longitudinal direction between an open position at which said hot plastics material can flow through said injection aperture into the injection mold and a closed position which stops flow of the plastics material through the injection aperture, a first micro gap being formed between said valve pin and said machined bore; and
- a machined piston connected to a rear end of said valve pin, slidably mounted in said actuator chamber, and adapted to move said valve pin between said open and closed positions by means of fluid pressure in said actuator chamber during use of the injection apparatus, a second micro gap being formed between said piston and said cylindrical wall whereby use of fluid seals between said piston and said cylindrical wall is avoided and said injection apparatus is able to operate at plastics injection temperatures in excess of 200° C.;
- wherein said first micro gap under normal operating conditions of the injection apparatus helps to prevent hot plastics material in said nozzle member from passing from said injection passage means through said first micro gap and into said actuator chamber.

19. An injection apparatus according to claim 18 wherein said nozzle member has a transversely extending additional passage that intersects said guide passage at a location spaced from said actuator chamber, said additional passage allowing any gases or plastics melt residue that has entered said machined bore to escape.

20. An injection apparatus according to claim 18 including an annular wiper seal extending around said valve pin and adjacent said machined bore, said wiper seal having a temperature resistance of more than 300° C.

21. An injection apparatus according to claim 18 wherein said second micro gap is in the range of 1 to 20 μm.

22. An injection apparatus according to claim 18 wherein said second micro gap is in the range of 1 to 10 μm.

23. A hotrunner system for injecting plastics material from a plasticizer unit into an injection mold for molding plastics devices or parts, said system comprising:
- a hotrunner manifold having an inlet for receiving melted plastics material from said plasticizer unit and a plastics feed conduit connected to said inlet, said manifold being adapted for operation at a desired elevated temperature suitable for flow of said melted plastics material through said manifold without undesirable degradation, said manifold forming actuator chambers;
- a plurality of nozzle members mounted on at least one side of said manifold and each having a longitudinal axis, each nozzle member having an injection passage operatively connected to a respective outlet of said feed conduit and extending to a nozzle tip and having a longitudinal guide passage formed therein;
- a plurality of elongate valve pins each extending through a respective one of the guide passages and movable therein between an open position at which said melted plastics material can flow from the respective nozzle tip into the injection mold and a closed position which stops flow from the nozzle tip; and
- a plurality of pistons each connected to a rear end of a respective one of the valve pins, slidably mounted in an associated one of the actuator chambers, and adapted to move its respective valve pin between said open and closed positions by means of fluid pressure in the associated actuator chamber, said pistons and cylindrical walls of the manifold forming the actuator chambers being machined to close tolerances so as to form a micro gap between a peripheral wall of each piston and the adjacent cylindrical wall of the associated actuator chamber in the range of 1 to 10 μm, thereby avoiding fluid seals between each piston and the adjacent cylindrical wall,
- wherein each piston and its associated actuator chamber provide a valve pin actuator able to operate within plastic injection temperatures ranging between 200° C. and 400° C.

24. A hotrunner system according to claim 23 wherein said nozzle members are mounted on two opposite sides of said manifold and the or each nozzle member on one side is aligned in a back-to-back manner with a respective nozzle member on the opposite side and each aligned pair of nozzle members is associated with one of the actuator chambers and aligned therewith in the longitudinal direction of the nozzle members, the one actuator chamber containing two pistons, one for each of the nozzle members of the aligned pair.

25. A hotrunner system according to claim 23 wherein each valve pin actuator is a pneumatic actuator and gas bores are formed in said hotrunner manifold for delivering pressurized air or gas to or from each actuator chamber.

26. A hotrunner system according to claim 23 wherein each guide passage comprises a machined bore and a further micro gap is formed between each valve pin and its respective machined bore, said further micro gap under normal hotrunner system operating conditions helping to prevent hot melted plastics material in the respective nozzle member from passing through the further micro gap into the adjacent actuator chamber.

27. A hotrunner system according to claim 26 wherein each nozzle member is formed with a transversely extending additional passage that intersects the machined bore of the nozzle member at a location spaced from the adjacent actuator chamber, said additional passage allowing any gases on plastics melt residue that has entered the machined bore to escape.

28. A hotrunner system according to claim 23 wherein the cylindrical wall of each actuator chamber has a machined nitride surface which is harder than said peripheral wall of the associated piston.

* * * * *